United States Patent
Burne et al.

(10) Patent No.: US 7,656,895 B2
(45) Date of Patent: Feb. 2, 2010

(54) METHOD AND DEVICE FOR COUPLING A POTS TERMINAL TO A NON-PSTN COMMUNICATIONS NETWORK

(75) Inventors: George L. Burne, Saratoga, CA (US); Richard M. Wieland, Princeton, NJ (US); Michael D. Diesso, Princeton, NJ (US)

(73) Assignee: WiLine Networks, Inc., San Mateo, CA (US)

( * ) Notice: Subject to any disclaimer, the term of this patent is extended or adjusted under 35 U.S.C. 154(b) by 1120 days.

(21) Appl. No.: 10/794,004

(22) Filed: Mar. 4, 2004

(65) Prior Publication Data

US 2005/0195799 A1 Sep. 8, 2005

(51) Int. Cl.
 *H04J 3/16* (2006.01)
(52) U.S. Cl. .................. 370/465; 370/352; 370/401
(58) Field of Classification Search .................. 370/352, 370/353, 354, 355, 356, 389, 390, 392, 395.5, 370/395.6, 400, 401, 465, 466, 469
See application file for complete search history.

(56) References Cited

U.S. PATENT DOCUMENTS

| | | | |
|---|---|---|---|
| 6,208,644 B1 * | 3/2001 | Pannell et al. ............... | 370/389 |
| 6,452,923 B1 * | 9/2002 | Gerszberg et al. ........... | 370/352 |
| 6,515,996 B1 * | 2/2003 | Tonnby et al. ............... | 370/401 |
| 6,563,816 B1 * | 5/2003 | Nodoushani et al. ......... | 370/352 |
| 6,614,786 B1 * | 9/2003 | Byers .......................... | 370/353 |
| 6,760,324 B1 * | 7/2004 | Scott et al. ................... | 370/352 |
| 7,139,263 B2 * | 11/2006 | Miller et al. ................. | 370/352 |
| 7,215,663 B1 * | 5/2007 | Radulovic .................... | 370/356 |
| 7,283,519 B2 * | 10/2007 | Girard ......................... | 370/353 |
| 2001/0028644 A1 * | 10/2001 | Barzegar et al. ............. | 370/352 |
| 2002/0061012 A1 | 5/2002 | Thi et al. | |
| 2002/0101860 A1 * | 8/2002 | Thornton et al. ............. | 370/352 |
| 2002/0191557 A1 | 12/2002 | Chow et al. | |
| 2003/0076815 A1 * | 4/2003 | Miller et al. ................. | 370/352 |
| 2004/0001479 A1 * | 1/2004 | Pounds et al. ................ | 370/352 |
| 2004/0228336 A1 * | 11/2004 | Kung et al. .................. | 370/352 |
| 2005/0232246 A1 * | 10/2005 | Dowling ...................... | 370/352 |
| 2005/0286466 A1 * | 12/2005 | Tagg et al. ................... | 370/329 |
| 2008/0313543 A1 * | 12/2008 | Altberg et al. ............... | 715/730 |

OTHER PUBLICATIONS

International Search Report issued in corresponding PCT Application No. PCT/US05/07138 on Jul. 7, 2008.

* cited by examiner

*Primary Examiner*—Chi H. Pham
*Assistant Examiner*—Kevin Mew
(74) *Attorney, Agent, or Firm*—Ernest J. Beffel, Jr.; Haynes, Beffel & Wolfeld LLP

(57) ABSTRACT

A communications device is used to interface a plain old telephone system (POTS) terminal, which includes a dial-up modem to transmit data, to a communications network. The communications device appears to the POTS terminal to be a modem accessed via a telephone network.

31 Claims, 9 Drawing Sheets

| Start Flag 1 byte 0xFF 1102 | Version 1 byte 1104 | Frame Length 2 bytes 1106 | SRCID 13 bytes 1108 | DSTID 13 bytes 1110 |

| SessionID 8 bytes 1112 | SessionFlag 1 byte 1114 |

| Packet Length 2 bytes binary 1116 | Packet Data — 1118 | Option Length 1 byte 1120 | Option Data — 1122 | Stop Flag 1 byte 0xFE 1124 | LRC 1 byte <LRC> 1126 |

Fig. 11

| Protocol ID 2 bytes ASCII '00' 1202 | Version 1 byte 1204 | CODE 2 bytes ASCII 1206 | SEQID 1 byte hex 1208 | SEQN 2 bytes hex 1210 | DATA ... 1212 |

Fig. 12

METHOD AND DEVICE FOR COUPLING A POTS TERMINAL TO A NON-PSTN COMMUNICATIONS NETWORK

BACKGROUND OF THE INVENTION

The present invention relates to using a communications device to interface a plain old telephone system (POTS) terminal to a communications network. In particular, it relates to a communications device that appears to the POTS terminal to be a telephone network.

POTS terminals have been deployed by many merchants, small and large, to handle retail sales transactions. These terminals typically have been designed to be plugged into a phone line (e.g., an analog or ISDN phone line, in various regions of the world) and to connect through a public switched telephone network (PSTN) with a host, when a sales transaction needs to be processed. The terminal listens for a dial tone, dials, connects and exchanges data with a host system.

POTS terminals have not gained general acceptance for other, non-merchant applications, such as vending machines, because of the small transaction size and the complexity of providing telephone connections. Processing small transactions with dial-up connections is often cost prohibitive. Providing a telephone connection is complex, because the owner of the vending machine typically does not own or operate the facility where the vending machine is located.

For POTS terminals in general, obstacles to migration to data packet technologies include the cost and complexity of replacing incumbent terminals.

Given the pricing and installation advantages of wireless and other data packet transmission services, an opportunity arises for methods and devices that interface a POTS terminal to a packet-based communication network, while appearing to the POTS terminal to be a telephone network.

SUMMARY OF THE INVENTION

The present invention relates to using a communications device to interface a plain old telephone system (POTS) terminal to a communications network. In particular, it relates to a communications device that appears to the POTS terminal to be a telephone network. Particular aspects of the present invention are described in the claims, specification and drawings.

Figure 7:
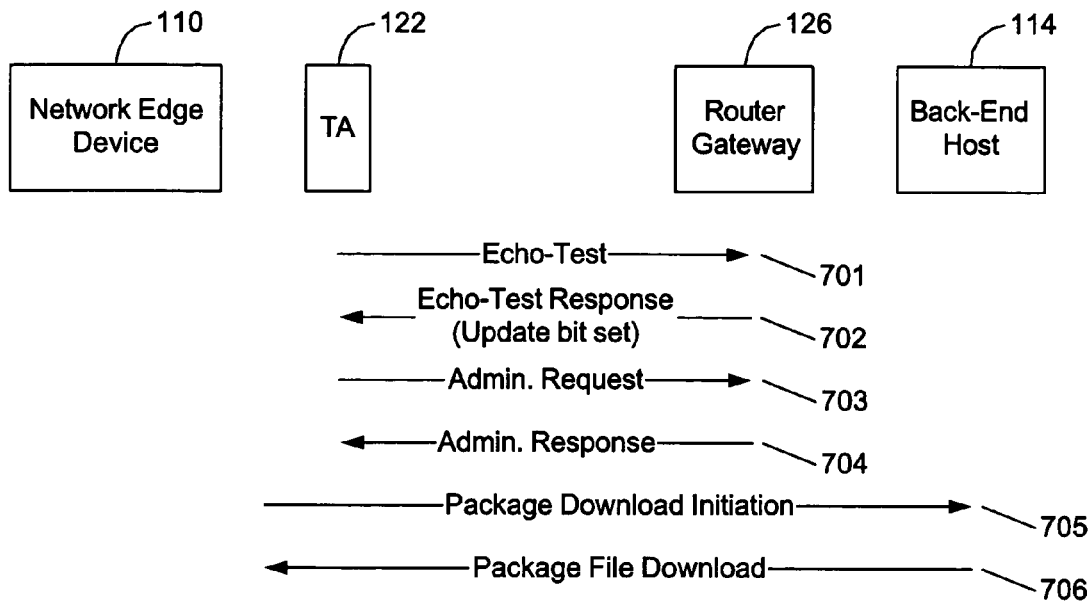
Figure 8:
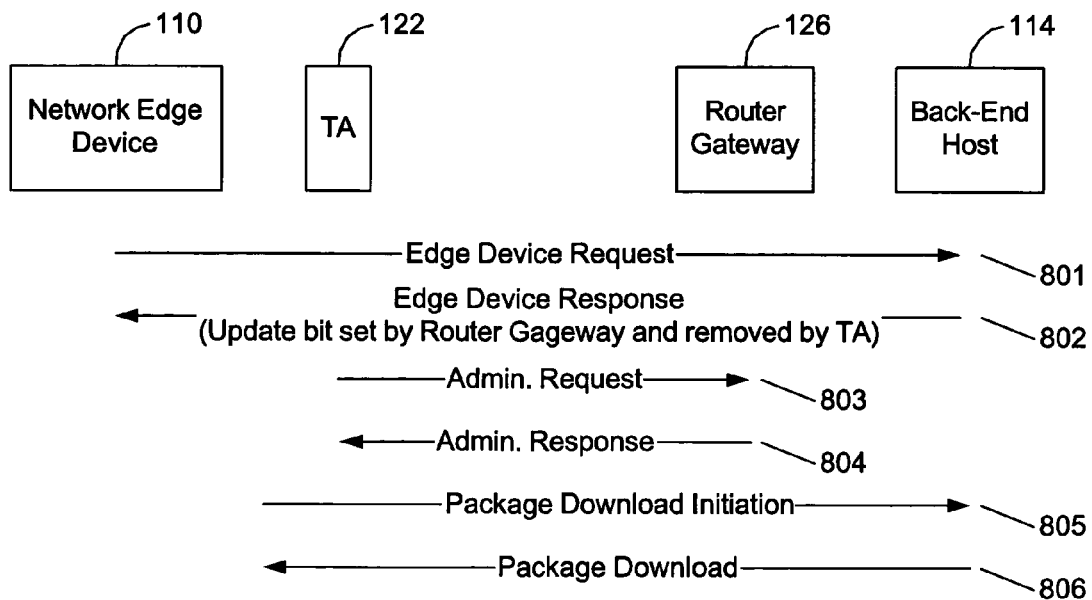

The message flow in the case where a configuration update Administrative request is initiated via an Echo-Test response is illustrated in FIG. 7, and the message flow in the case where the configuration update process is initiated directly by the router gateway Admin process is illustrated in FIG. 8.

Figure 9:
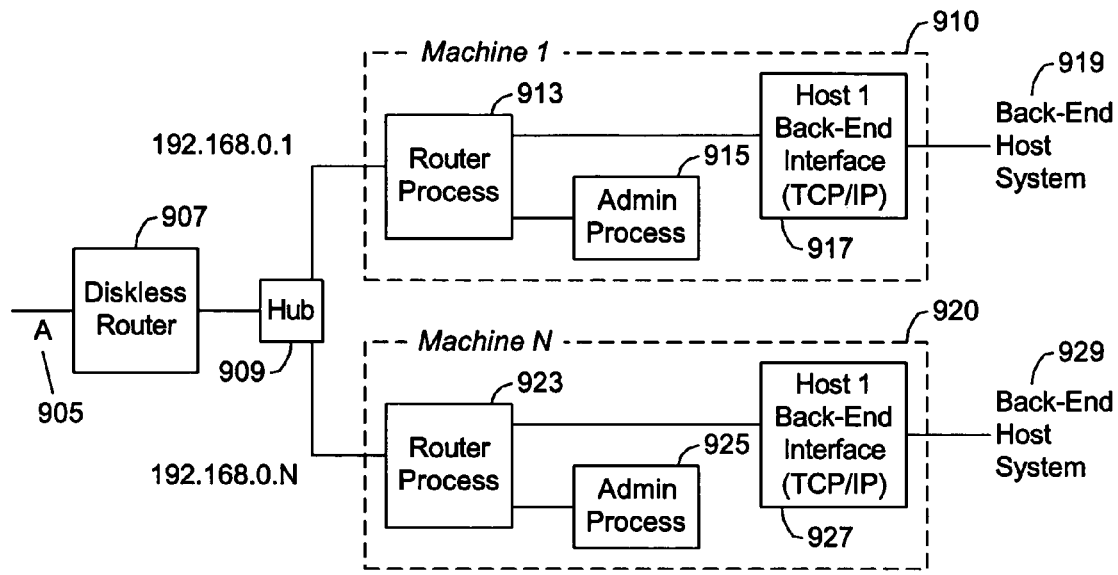
Figure 10:
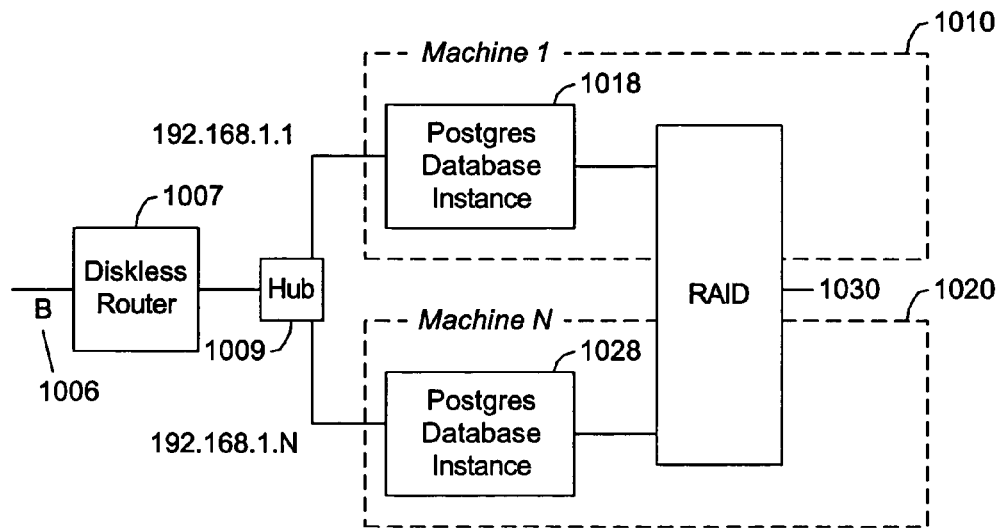

FIG. 9 provides an overview of clustered hardware interactions. The clustered database environment may parallel the clustered host environment, as depicted in FIG. 10.

At a frame level, FIG. 11 depicts an encapsulation scheme and fields transmitted to implement that scheme.

The protocol packet format is depicted in FIG. 12.

Figure 13:
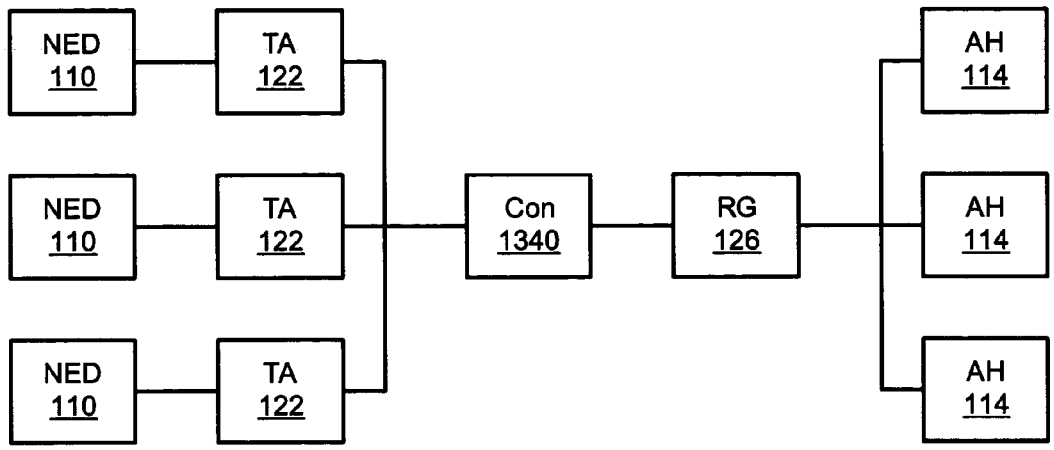

A packet concentrator and router gateway configuration is illustrated in FIG. 13.

Figure 14:
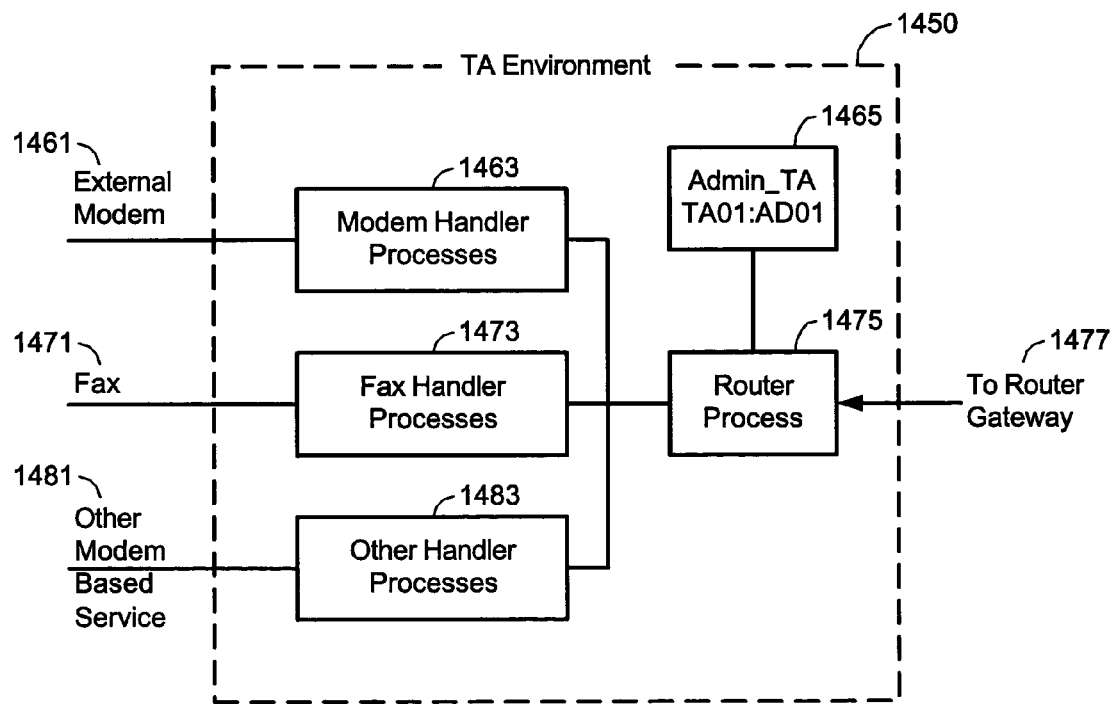

FIG. 14 is a block diagram of a terminal adapter.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

The following sections provide an overview, describe a terminal adapter (TA), a router gateway (RG) and a protocol for TA-RG interaction.

Version one of the terminal adapter (TA) is designed to replace physical fixed communications lines used for data transfer with wireless connections. Unless being replaced for other reasons, the network-edge device that originally connected to the fixed line networks (e.g. Plain Old Telephone System [POTS]) physical network is unchanged from a hardware and software perspective. Examples of network-edge devices include Point of Sale (PoS) terminals, ATMs, utility meters and vending machines. TA products are designed to replace fixed communications lines in hierarchical networks. Network-edge to network-edge device communications need not be supported. Hierarchical networks as used within the context of this document means that all network-edge devices have an associated central computer system with which they are programmed to communicate.

Figure 1A:
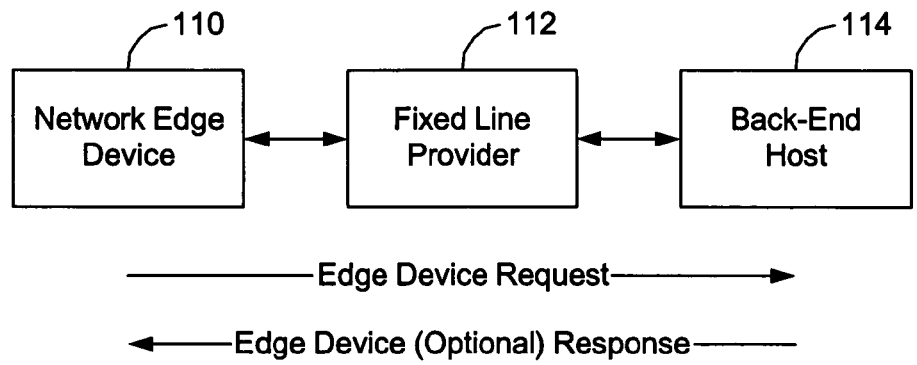
FIGS. 1A-1B provide a before/after overview.
Figure 1B:
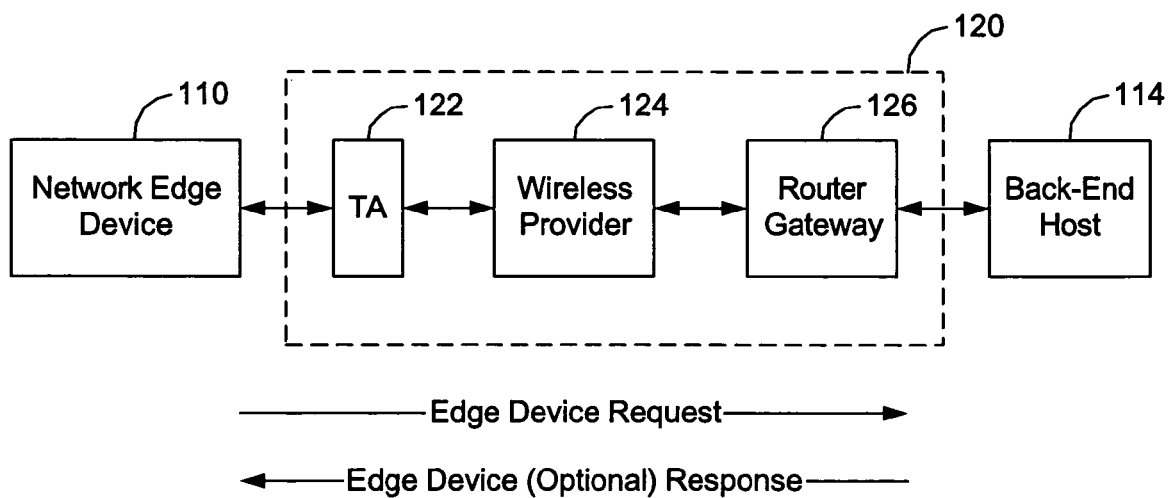

FIGS. 1A-1B provide a before/after overview of a network into which the new technology is introduced. The TA exposes a conventional fixed line interface into which the end point device is connected. The TA is designed to emulate the fixed line network (provides necessary line voltages/currents, tones, etc.), intercept calls that the end point device makes and seamlessly converts the data transmitted by the end point device into wireless data packets.

In areas of weak WAN signal strength within a particular premises, a variant version of the terminal adapter consists of two devices—a POTS to 802.11b (WiFi) unit and an 802.11b (WiFi) to WAN unit. This configuration will also be used to support scenarios in which multiple physical lines within a particular location are being replaced—the 802.11b (WiFi) to WAN unit is capable of multiplexing multiple POTS to 802.11b (WiFi) units onto a single wireless line. Other embodiments of TA devices support Ethernet to WAN and ISDN to WAN.

In addition to the actual data that the network-edge device (e.g. a soda can dispenser) is attempting to transfer, the TA sends additional information that the router gateway can use to route the data to the appropriate destination (e.g. The telephone number or X.25 address dialed by the end point device or nodal information relating to the network itself). Note that neither the TA nor the router gateway modify the data that the network-edge device or back-end host system is sending/receiving in any way.

Terminal Adapter (TA)

Focusing on the terminal adapter, traditional embedded systems were defined as products that performed one specific task, typically consisting of input/output signal handling and control logic stored in firmware. The increase in hardware performance and lower cost of hardware has blurred the line between general purpose computers and embedded systems. The TA is classified as an embedded system product in that it does not load its operating system or applications from hard drives, floppy drives or CD-ROM devices. The TA operating system and application(s) are stored in flash memory, statistical and configuration data is stored in battery-backed RAM.

Figure 2:
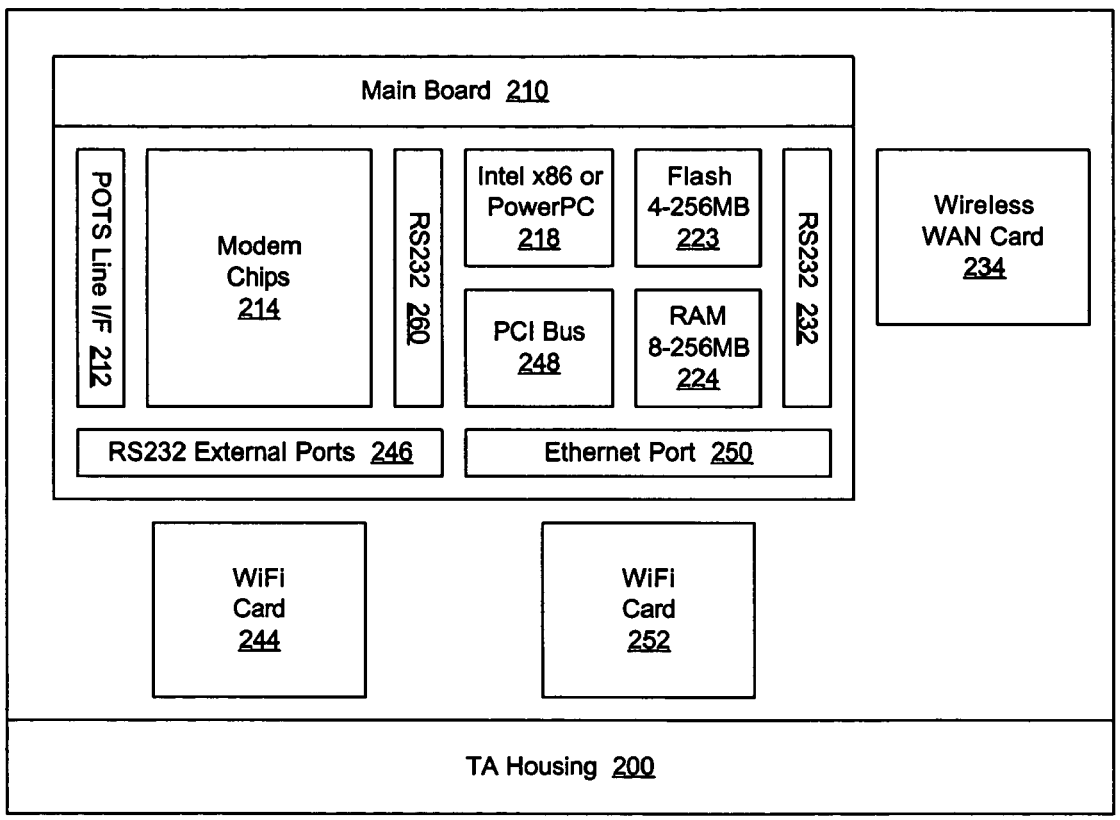
FIG. 2 provides an overview of the major components that make up the TA device.

FIG. 2 provides an overview of the major components that make up the TA device. The TA main board 210 employs either an Motorola PowerPC or Intel x86 processor 218. Alternatively, an ARM SA-1110 processor and SA-1111 companion chip could be utilized. One embodiment employs 16 MB of flash memory 223 connected to the main board via the PCI bus 248 for ease of kernel replacement during the debugging phase. In another embodiment, the flash memory 223 will be mounted directly on the main board 210. In addition to the PCI bus 248, the main board 210 supports an Ethernet port 250 and a plurality of internal and external RS232 ports 260, 232 and 246. The PCI bus 248 allows connection of multiple PCI devices via add-on adapters. The RS232 interface ports may provide full hardware or software only flow control. The main board may support 4-128 MB of flash memory or more and 128 MB of RAM or more, connected directly to the main board 210 or via a standard connector, such as a DIMM socket.

The operating system running on the main board 210 is a customized version of embedded Linux 2.4.x. Linux offers reliability and efficiency with a proven track record and has been ported to many different processors including Intel x86 and PowerPC. Other operating systems including VxWorks, Windows CE or in-house developed could be substituted for Linux.

The operating system kernel is stored in non-volatile memory, such as flash memory, or it can be stored in battery backed RAM. It also could be stored on rotating memory. It can access routines stored in RAM if required. The TA is designed to run a customized version of PowerPC or Intel x86 Linux. The TA kernel is built on a standard PC workstation using a cross compiled version of the GNU tool chain. The TA will employ a current version of GNU glibc, as the TA contains sufficient memory to support it.

The TA application can reside in battery backed RAM.

The POTS interface 212 uses a combination of a standard data/fax/voice modem chip set and a programmable Si-DAA. The Si-DAA provides the necessary line voltages/currents/impedance required to emulate a conventional POTS network. The data/fax/voice modem chipset provides both the DTMF parsing to detect the number that was being called and the receiving end-modem capabilities to emulates the modem on the host system that the end-point is making a call to. One embodiment of the TA included support for a plug-in card based modem with either a built-in controller or one that depended on software running on the main board to provider the controller functionality. Another embodiment uses an integrated modem chipset 214 mounted directly on the main board.

The WAN interface supports outgoing calls from the TA and optionally may support incoming calls to the TA. In one embodiment, the TA employs an OEM GSM or IS-95 (either 2.5G or 3G) modem 234 from Research In Motion (US model 1902GS) or Motorola (g20). The wireless modem is connected to the main board 210 via an RS232 interface 232. The RIM GPRS module may either use a SIM card slot integral to the modem unit or a SIM card slot that is remote from the actual modem. Note that in the scenario in which the SIM slot is not integrated into the 2.5G or 3G modem, the TA is designed to manage multiple external SIMs (typically supplied by different cellular network operators) and can automatically switch between if network outages are detected. In a separate embodiment, an OEM Metropolitan Area Network (802.16/802.20 MAN) modem 234 such as those from Intel or Fujitsu is connected to the main board 210 via an RS232 interface 232 or PCI interface 248.

The TA optionally may support both a client and server WiFi card 244, 252 connecting to the main board 210 via a PCI interface 248. The WiFi card is controlled via a driver built into the Linux kernel.

The TA application designed to run on the TA hardware described above can be divided into three modules: end device call processing module, TA maintenance module and TA statistics module.

The TA call processing application is automatically started by the TA at boot time and is a permanently running application. The TA kernel automatically restarts the call processing module if it stops for any reason.

The TA call processing module is responsible for converting POTS calls initiated by the end device into wireless calls, managing the data transfer associated with these calls, maintenance message routing and statistics collection. It also can handle additional functions or some of these functions can be delegated to other modules. Maintenance requests serve at least two purposes from the perspective of the TA. The first relates to network status. The maintenance request tells the Gateway Router (in the absence of data transfer requests) that the TA is alive and functioning. The second is to allow the Gateway Router to inform the TA that there are application or parameter updates available.

The TA call processing module is also responsible for generating and sending maintenance requests to the Gateway Router at configurable intervals. These maintenance requests may be sent if calls are not being generated by the end-device, that is a PoS device is not being used to process transactions. It also may be sent if other error conditions are detected. In one embodiment, response messages from the Gateway Router contain a flag indicating whether a maintenance update is required or not. If the TA is processing calls on its POTS interface, the Gateway Router is aware of the status of the TA and can indicate that updates are available in the response messages. If there are updates to be processed, the call processing module passes the request to the TA maintenance module. The TA maintenance module is described below.

The TA call processing module is further responsible for collecting statistical data relating to authorization/batch and end device maintenance call processing, to be used by the TA statistics module, as discussed below.

Figure 3:
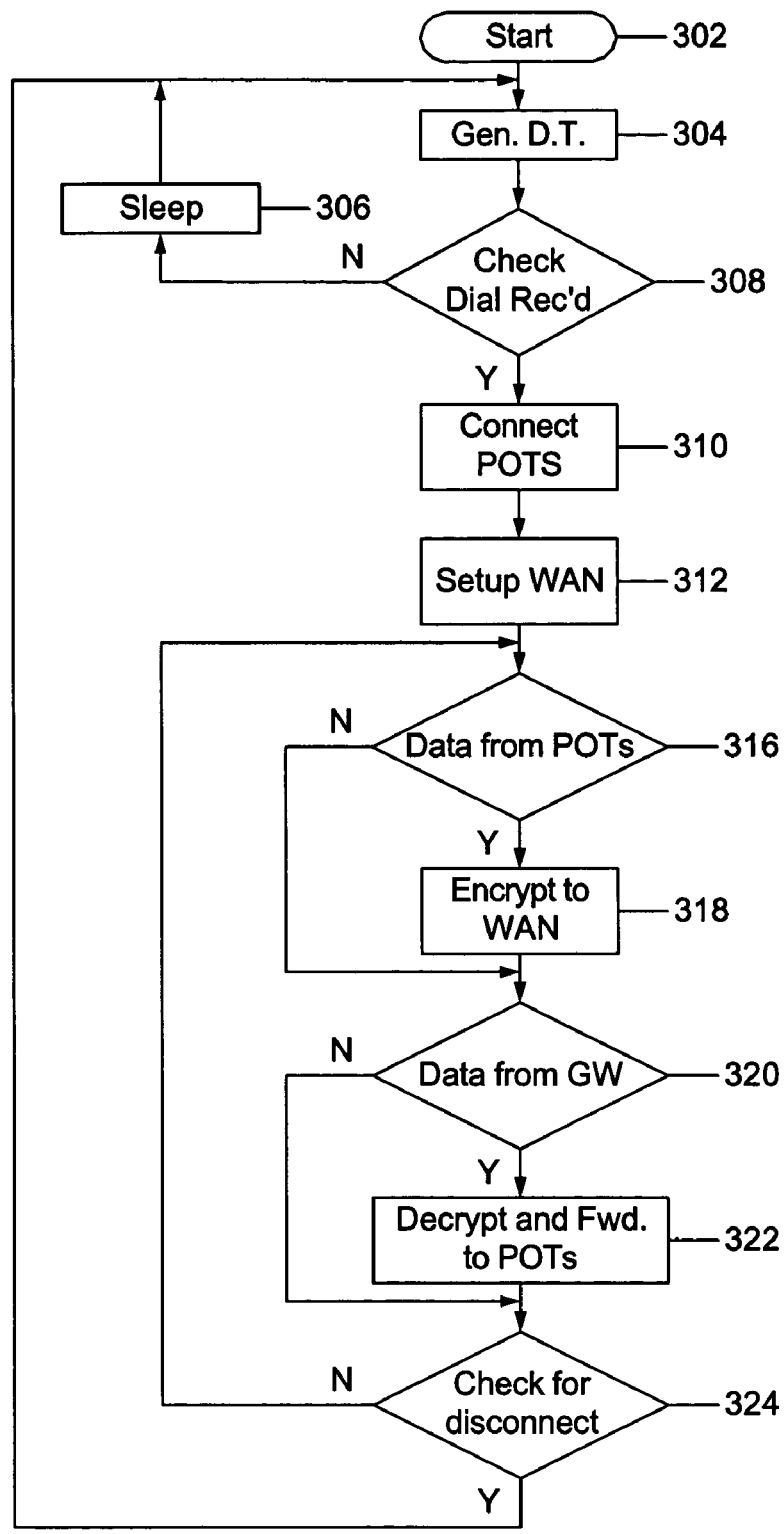
FIG. 3 provides a high level overview of the logic associated with the direct POTS<-->WAN call conversion module of the TA application.

FIG. 3 provides a high level overview of the logic associated with the direct POTS<-->WAN call conversion module of the TA application. The flow begins at start 302. The terminal adapter generates a dialtone 304 and checks to determine if a dialing sequence is been received from the Network Edge Device 308. If no dialing sequence has been received, the terminal adapter sleeps for some time 306, or loops directly back to generating a dialtone 304. If a dialing sequence has been received, the terminal adapter generates a connection to the Network Edge Device 310. In one embodiment, the terminal adapter sets up its connection to a communications host or router gateway 312. Alternatively, this connection may be pre-established, as described elsewhere. The terminal adapter tests for communications generated by the Network Edge Device 316, optionally encrypts them, and transmits them to the communications host 318. If there are no communications from the network edge device, the encrypt/transmit step is skipped and flow continues to 320. In a second part of the flow, the terminal adapter checks to determine whether it has any response from the communications host 320 that it needs to process. If not, the decrypt and forward step 322 is skipped. If there is a response from the communications host, it may be forwarded to the Network Edge Device 322, optionally after decryption. In most cases, processing returns to reading the Network Edge Device 316 and checking for communications from the communications host 320. In some cases, a disconnect will be detected and processing will return to generation of a dial tone 304.

The maintenance application is started by the TA call processing module as required. The process of obtaining updates to TA applications, libraries or parameters is automated, facilitating operation of the TA as an unattended device. The maintenance component of the Gateway Router system allows an operator to flag that a particular device (or group of devices) is due to receive application or parameter updates. The Gateway Router therefore always knows if a particular TA requires an update. The TA devices implicitly poll the Gateway Router for updates via call processing requests or may make dedicated maintenance request messages. In addition, the Gateway is able to initiate maintenance requests to the TA. In one embodiment, the TA maintenance application is always responsible for initiating maintenance calls. This facilitates operation with components or networks that do not support data calls from the network to end point devices.

When the Gateway Router receives a call, either an end device call processing request or a TA maintenance request call, it checks to see if the TA on the call requires an application/parameter update. If so, it delivers the necessary update information or at least a flag indicating that it has an update available when the TA is ready. The TA employs dedicated messages within the TA<->Router Gateway protocol to manage the download of application updates, parameter updates are sent in the regular end-device call or maintenance response messages. Other protocols that could be used include file transfer protocols such as ftp, tfp, ssh/scp or package management protocols such as apt-get, ipkg, rpm, etc. The TA maintains its configuration parameters in a standard ASCII file.

The statistics module is started by the TA kernel at an appropriate time, for instance corresponding to a parameter managed by the Gateway Router maintenance module. The TA call processing module collects a variety of statistics including the number of transactions (authorization, batch or maintenance) performed, the number of failed WAN connection attempts, the number of dropped WAN calls, minimum, maximum and average response time, etc. The process of collecting statistics and delivering this statistical information to the Gateway Router Statistics module is therefore automated. In one embodiment, the TA statistics application is responsible for initiating statistics upload calls. The Gateway Router Statistics module accepts and stores the uploaded statistical information in the system database. The TA employs dedicated messages within the TA<->Router Gateway protocol to manage the upload of statistics files. Prior to uploading statistical data, the TA maintains the statistical data in a standard ASCII file in the TA file system.

Call routing allows the TA device to emulate a POTS network and receiving end modem from the perspective of the end-device. Once a TA has been installed in place of a traditional POTS line, the end-device assumes that it has connected directly to its associated host when, in fact, it has only connected locally to the TA.

The TA routes the data it has received from the end-device to the end device's associated host. The TA could conceptually connect to multiple different Gateway Routers, for instance, GRs in various banks with which a merchant has contracts for processing different card types. During the process of connecting to the end device, the TA reads the telephone number that the end-device had called via the DTMF tones. The TA maps different telephone numbers to different Gateway Router IP addresses as appropriate.

In one embodiment, routing for a particular country is being performed by a single instance of the Gateway Router, which may be implemented across numerous physical machines. The GR will hold a telephone number/IP address mapping table with all IP addresses pointing to the gateway. The mapping table is maintained at the Gateway Router and distributed to TAs as part of the regular maintenance scheme.

IPSec is employed as standard security between TAs (in a multiplexed scenario) or between TAs and the Router Gateway. IPSec provides authentication, data integrity and encryption. IPSec is implemented at the Linux kernel level and is therefore transparent to the individual processes running on a TA or Router Gateway. Other security mechanisms such as SSL/TLS can be substituted.

Each TA device has two unique identification numbers, a Hardware Serial Number (HSN) which is configured when the device is manufactured and a Machine Id (otherwise referred to as a TA Id.) which is automatically supplied by the Gateway Router on first contact. For instance, the identification number could be the serial number of the X.509 certificate employed for the TA <--> Gateway Router interface. The unique identification numbers may be used by the device throughout its lifetime. The TA identification number is used by the TA to identify itself in all requests. It may be useful to avoid basing this TA identification number in or on a SIM card, as SIMs may be changed regularly to take advantage of cellular network pricing deals, which may involve swapping merchants over to new cellular network companies. Additionally, certain wireless networks (e.g. IS-95 CDMA or 802.16a) do not employ a SIM.

In order to connect to the router gateway via a wireless network, the TA is required to perform a number of steps. It first performs an "attach to the wireless network. Once attached, the TA requests a "PDP context in the case of cellular networks". Celcos define PDP contexts in different ways—the simplest is equivalent to signing onto an ISP and establishing a PPP connection in a dial-up scenario. Once a context has been established, the TA has been issued an IP address and can open a socket connection to any valid IP network that the ISP is connected to (e.g. The Internet, private corporate VPNs). In one scenario, the TA establishes a socket connection to the router gateway. The wireless operator automatically routes all data packets received from TAs to the router gateway over this socket. The router gateway is in turn responsible for routing these packets to the appropriate central computer system and for routing responses back to the appropriate TA via the wireless operator.

Router Gateway (RG)

The router gateway may route information, automatically deliver configuration files and software updates, support technical staff and installers, and act as a billing engine. It works in conjunction with installed TAs to route information between network-edge devices (e.g. a soda dispensing machine) and their associated back-end host systems (e.g. Replenishment notification server). It acts as an automated administration server for the delivery of configuration file and software updates to the installed base of TAs. Automated administration can be a valuable feature. The router gateway maintains a centralized database containing entries for all TAs. These entries reflect not only the business contract aspects of the TA but also configuration information including details of the specific handlers that should run on that TA at startup, the mapping of physical addresses (external addresses to use the terminology employed within this document) to physical ports (e.g. 408.555.1212 corresponds to the telephone number that should be used to address the fax machine connected to modem port 2 on modem handler 1), etc. Initial TA configuration information on the router gateway and automatic propagation to the TAs are discussed below. The router gateway may provide technical support staff and installers with a mechanism for registering/updating TAs on the router gateway and it may act as a billing engine.

The implementation of the router gateway is simplified if the following conditions hold: The RG process never initiates an outgoing socket connection; instead, other processes and/or devices such as TAs connect to it. An RG can receive socket connections from other TAs in a multiplexed scenario or from its own handlers and initiate socket connections to the Celco or to a master TA in a multiplexed scenario. A TA can establish a socket connection to only one concentrator node at any one time. This may be a router gateway or another master TA in the case of a multiplexed TA scenario. All communications are reliable, such as a TCP connection, as opposed to UDP based. In the TA network, traffic flows from handler to handler through router processes. An entity that initiates a new session (e.g. a TA handling a new modem call) generates a Session ID that identifies a session for both ends of the conversation. Frames are not split or sequenced during routing. Protocols define the communication between handlers. Each physical machine within an overall router gateway instance may contain only one Router process instance. Any of these conditions can be eliminated and the implementation made more general by modifying the embodiments described herein.

Like the TA, the router gateway may use a variant of the Unix operating system. The initial implementation is based on Linux running on a high availability, Intel based platform. PostGres or MySQL are employed as the system database.

Figure 4:
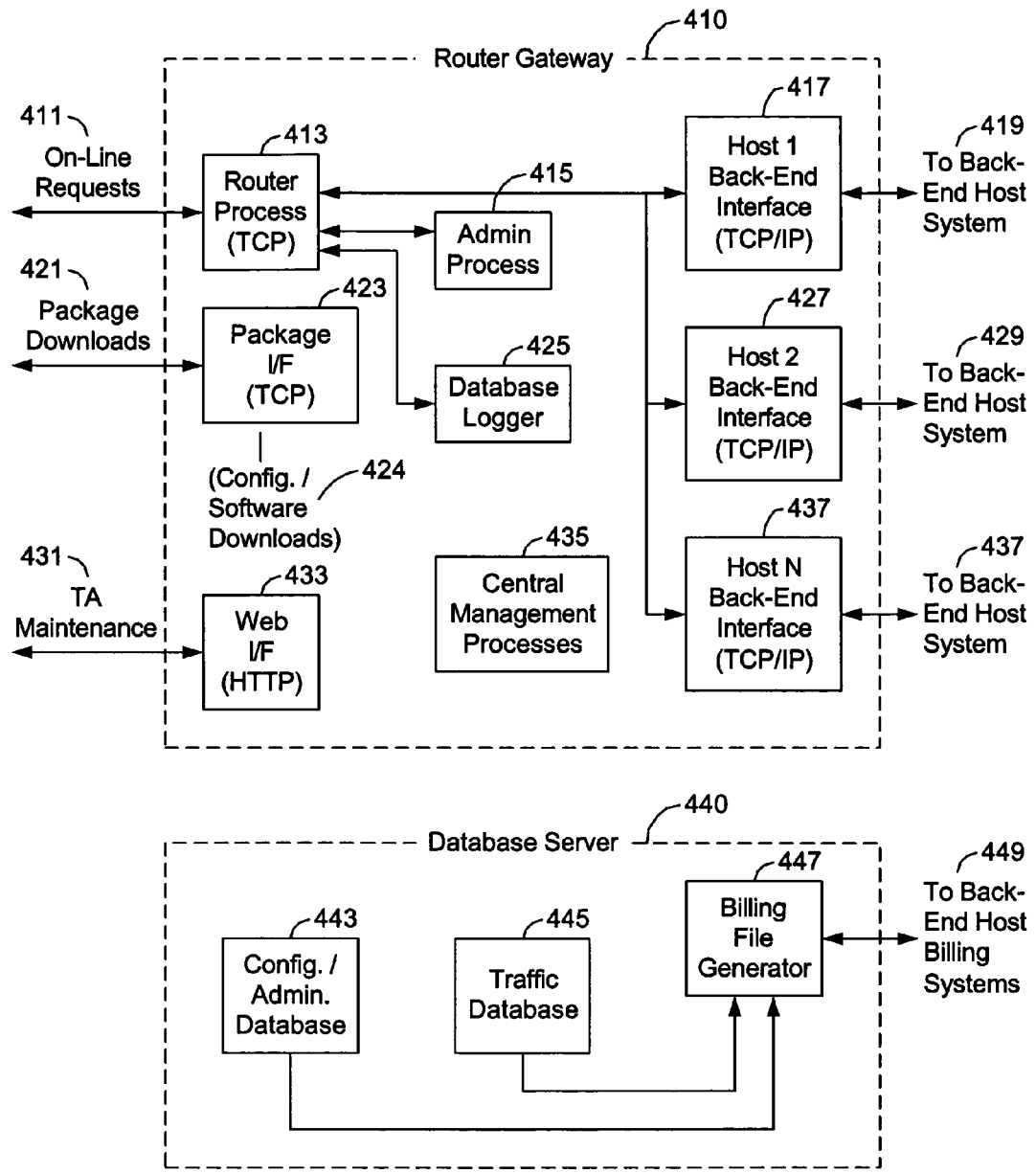
FIG. 4 is a block diagram of a router gateway.

FIG. 4 is a block diagram of a router gateway. A single logical instance of the router gateway 410 is designed to operate across multiple physical machines. FIG. 4 depicts a simplified overview of the major modules that make up the router gateway application. The router gateway application includes the following modules: Router Process 413, Package Interface 423, Web Interface 433, Administration Process 415, Database Logger 425, Back-End Host Interfaces 417, 427, 437, Traffic Database 445, Configuration/Administration Database 443, Billing File Generator 447, and Central Management Process 435. Using the interface processes, communications processed include on-line requests 411, package downloads 421, TA maintenance 431, back-end host systems 419, 429, 439, and back-end host billing systems 449. An overview of these components is provided below.

Router processes 413 are responsible for managing all on-line communications with TAs 411 and for routing information received from TAs with the appropriate internal 415, 425 or back-end host interface processes 417, 427, 437. As shown in FIG. 4, the alternate process type with which TAs communicate directly is the Package I/F 423. A router gateway 410 can be run on one or more machines, either logical (e.g., hyperthreaded) or physical machines. In one embodiment, a machine runs one Router process.

A Router process is designed to listen on a pre-configured port for incoming connections from the TAs, internal router gateway processes and back-end host interface processes. In one embodiment, one or more instances of a router process 413 will be started/forked when an overall router gateway instance 410 is started. The number of instances can be controlled in many ways, one being an overall system configuration database table. Router processes manage tables that implement mapping, routing and redirection. The Mapping Table is used by each Router process to map external addresses to hard addresses. The Mapping Table is static in the sense that it primarily changes when an operator adds or removes internal or back-end interface processes. The Routing Table maps Hard Addresses to socket connection IDs. It is dynamically generated by each Router process as it detects TAs or internal/back-end handlers connecting to it and utilizing its routing capabilities. The Redirect Table is dynamically generated and managed by the Router process 413 in order to manage exception processing.

Upon startup (or based on an update notification), a Router process 413 reads the Mapping Table from the system database. Once successfully started, a Router process will listen on a pre-configured TCP/IP port number. It will begin accepting connections from the various entities listed above and will dynamically build and maintain the Routing Table. In one embodiment, a Router process instance 413 will maintain a configurable upper limit for the maximum number of concurrent connections that it can handle. When this limit has been exceeded, the handler will refuse to accept additional connections. This does not mean that clients will not be able to establish connections, however, because the router gateway architecture 410 has been designed to operate on multiple physical machines each of which can have a Router process 413 running. These machines may be "front-ended" by a round-robin (session based) router which can detect machines no longer being available and route new incoming connection requests to machines that have available capacity. A variety of load balancing strategies can be used to allocate available physical machines. Additional requests for connections on this port number will be automatically routed to a machine that has available capacity by the front-end connection router.

A design in which a Router process does not initiate an outgoing socket connection across a cellular network, but accepts incoming TA connection requests, can accommodate TA components or cellular networks that do not support data calls from the network to end point devices. To implement this design feature, back-end handlers and internal router gateway processes look up the server names and port numbers of the various Router processes from the system database and initiate a connection to them. Router processes are connected directly to the potential back-end handlers supported by the system.

Figure 5:
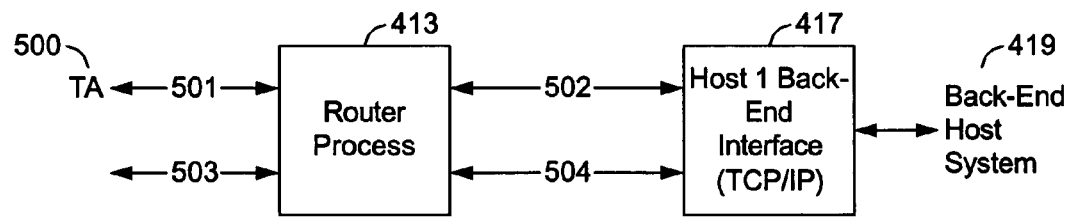
FIG. 5 depicts a flow associated with a particular data packet exchange.

FIG. 5 depicts a flow associated with a particular data packet exchange. In this flow, a TA 500 establishes a socket connection 501 to a particular Router process 413 at a pre-configured URL/port. The TA 500 performs a Sign-On/Sign-Off exchange with the router gateway before it can use the resources of the Router process 413. The Router process 413 creates a Routing Table entry associating the TA's MACHID (TAUID) with the particular socket handle it came in on based on this initial message flow 501. A back-end handler 417 establishes a socket connection to the Router process 413 at startup. Back-End handlers send an identification packet 502 containing its hard ID (MACHID:PROCID) before they will be registered as a valid destination by the Router process 413 to which it has opened a connection. The identification packet

502 includes a message containing a frame but no packet data. The Router process creates a Routing Table entry associating the MACHID of the Back-End Host Interface process 417 with the particular socket handle it came in on, based on this initial message flow 502. When the TA subsequently sends a data message 503, the Router process extracts the (hard) destination ID (MACHID:PROCID) sent by the TA from the frame header, maps it to a socket ID based on an entry in the Routing Table and forwards the message 504. Despite that fact that the router gateway/TA protocol is designed to be stateless, the router gateway—Router process takes into account the concept of sessions as discussed below.

TAs connect to the router gateway via one or more wireless—Wide Area Networks (WAN) or Metropolitan Area Networks (MAN). Examples of these networks include GSM/IS-95 cellular telephone networks or 802.16/802.20 MANs. The TA typically establishes an IP connection connects to the wide area wireless network using the appropriate standard (GSM, IS-95, 802.16, 802.20). The TA then establishes a TCP connection to the Router Gateway over the pre-established IP link. using either 2.5G or 3G wireless standards, Note that when the TA attempts to establish the TCP connection to the Router Gateway, transparently to the TA the celco wireless network operator establishes a non-wireless (fixed line) connection to the Router Gateway and subsequently bridges all data communications then between the wireless and fixed connections. For example, in the case of a GSM GPRS network the operator establishes a connection from an in-house system (called a GGSN in the case of GPRS) to the router gateway over a fixed line interface/network. The network most commonly employed by 2.5G and 3G wireless network operators (celcos) to connect to external third party host systems is the Internet. Data applications that reside on the extremities of a wireless network (edge devices) can make reliable or unreliable socket connections (e.g., TCP or UDP socket connections) to one or more host computer systems and theoretically to other edge devices on a peer-to-peer basis.

Incoming connections to an RG should be reliable or TCP-based. Connections can exist for the duration of an edge device data transfer session or can be held open by the edge-device and employed for multiple (potentially concurrent) data transfers. Depending on celco tariffs, connections can be held open unless closed by the edge device or an inactivity timer (clean-up routine).

The router gateway process 413 is adapted to carry out several tasks: answering multiple concurrent incoming connection requests from TAs on pre-configured port number(s); answering multiple concurrent incoming connection requests from internal gateway servers or back-end interface handlers on preconfigured port numbers; routing received packets to the destination address over a TCP/IP socket; dynamically generating and maintaining Routing and Redirect tables to be used to route messages between hard addresses; logging information to a per process configurable log-file; transmitting information exchanged between a TA and a back-end interface to the router gateway Database Logger process for logging in the system database, if configured to do so; and transmitting process specific management/statistical data to the router gateway central management process.

The TA interface 413 supports interleaved requests over a single socket, to either a TA 500 or a back-end interface process 417, so the data flow may not be of the form request 1/response 1/request 2/response 2, etc. A valid data flow might be request 1/request 2/response 2/response 1. The TA Interface is coupled to the configuration and administrative database 443 in order to load process configuration parameters, retrieve TA administrative information and update version information received from remote TAs. The TA Interface is responsible for logging network-edge device/back-end host traffic to the traffic database 445 via the router gateway Logger process 425.

The router gateway Package Interface 423 provides remote TAs with the ability to download configuration files or software upgrades 421. A TA is informed via a flag in the on-line interface response header that it is required to perform an administrative function. Via the administrative process 415, the TA is given the names of the files that it needs to download via the Package interface 423.

The Administration Process 415 of the router gateway system 410 is responsible for performing validity checks on received packets and for routing administrative requests/responses to/from the TA Administration database 443.

The WEB interface 433 provides remote authorized users with the ability to carry out browser-based administration tasks such as TA registration, contract detail entry, help desk contact, etc. against the TA Administration database 443. The WEB Interface is coupled to the database 440 in order to manage process configuration parameters, manage TA administrative information from the system database and perform on-line reporting.

The Administration process 415 carries out tasks of: exchanging Sign-On/Sign-Off request/response message pairs with TAs; exchanging Echo-Test request/response message pairs with TAs; exchanging Registration request/response message pairs with TAs; exchanging Version request/response message pairs with TAs; generating and sending TA Configuration Update instructions; logging information to a per process configurable log-file; and interfacing to the system database. The Administration Process will be coupled to the database in order to manage process configuration parameters.

The Database Logger 425 logs information flowing between the network-edge devices and the supported back-end host systems.

The Back-End Host interface 417, 427, 437 caries out tasks of: maintaining multiple concurrent socket based connections to Router processes (assumed one connection per router gateway-Router process); sending identification packets to Router process 413 after successfully establishing a socket connection; forwarding received packets to the appropriate Back-End Host 417 over a TCP/IP socket; and buffering received packets for use in matching to responses received from the relevant back-end network via the Session IDs received in message frame headers if the Back-End interface has a one-to-one mapping between sessions and physical ports. Alternatively, the Back-End Handler could match request and response messages and deduce the correct session-ID. The Back-End Handler also logs information to a per process configurable log-file and transmits process specific management/statistical data to the router gateway central management process. Back-End interfaces are adapted to support interleaved requests over a single socket, as described above. The Back-End interface should support making and/or breaking connections on a per transaction basis and being able to open a connection to a Back-End Host and hold it open indefinitely. In make/break mode, the interface supports exchanging a confirmation packet between a network-edge device and a back-end host, to provide a request/response/confirmation flow. The Back-End Interface is coupled to the database to manage process configuration parameters.

The router gateway system may use a database 440 such as the PostGres or MySql database. The Logger Process module 425 is responsible for storing all data packets exchanged between the network-edge devices and the back-end host systems in the data traffic database 445. The database architecture selected should be adapted to high traffic volumes, ease of archiving and skimming, high availability and storing different types of request formats. The system may not be configured to store all traffic; only certain categories of traffic may be stored or traffic meeting certain criteria, such as last three days or amount exceeding a certain threshold or revenue generating traffic.

The Configuration/Administration database 443 holds configuration information for individual TAs. This information is employed for tasks such as automatic updating of remote TA configuration information, managing TA Registration/Contract details and validation of TAs by the Router process 413 when a connection is being established or during the processing of packets.

The Billing File Generator 447 is responsible for generating billing information files that are sent to the operators of the various back-end host systems 449 for subsequent inclusion in the merchant invoices. Billing files are generated based on the request data contained in the traffic database and configuration information from the Configuration/Administration database. Where required, separate billing files can be generated for each back-end host system. The format of the generated billing files may vary by back-end. The Billing File Generator can be operated as a batch process, configured to run one or more times per day, week or month.

The Central Management module 435 manages the individual processes that make up the router gateway. This module is responsible for configuring the processes that will start automatically when the router gateway is started, informing processes that configuration updates have occurred, starting and stopping the router gateway and individual processes, and providing an interface via which individual processes can report error conditions, alarms and operational statistics.

TA to RG Protocols

Figure 6:
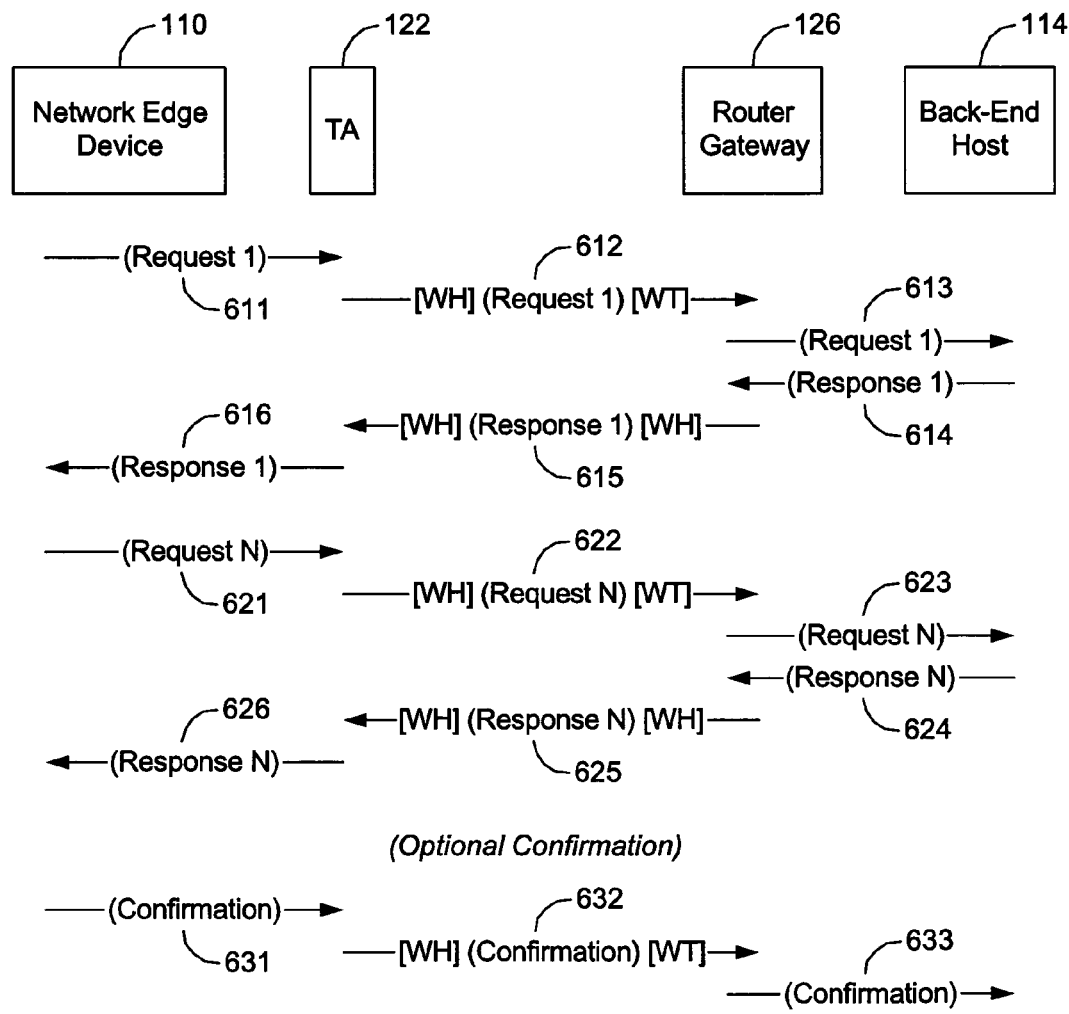
FIG. 6 illustrates one protocol for exchanges between a TA and RG.

One protocol for exchanges between the TA 122 and RG 126 is illustrated, at a high level, in FIG. 6. The TA and router gateway encapsulate data being exchanged by a network-edge device 110 and a back-end host system within a predefined protocol. Encapsulation is accomplished by wrapping the original message data in a header and trailer. The TA and router gateway add protocol information to data received from either the network-edge device 110 or back-end host system 114 to support their interaction and remove the protocol information before sending the data received to either the back-end host system 114 or the network-edge device 110. FIG. 6 provides an overview of the insertion and removal of headers in a scenario in which a network edge device and a back-end host are communicating using a request/response/confirmation based protocol. In messages 612, 615, 622, 625, 632, both headers ("WH") and trailers ("WT") are indicated. Alternatively, all of the information could be added to a header. With some record formats, such as fixed length, specified length or fixed terminator formats, or by using a record end delimiter, all of the information could be added to a trailer. In FIG. 6, some numbering is borrowed from FIG. 1, for the Network Edge Device 110, the terminal adapter 122, the router gateway 126 and back-end host 114. Encapsulation is illustrated with a request 611, 621, 631 from the Network Edge Device 110 to the terminal adapter 122. The terminal adapter 122 forwards the request to the router gateway 126 adding a header and/or trailer 612, 622, 632. The router gateway 126 communicates 613, 623, 633 with the back-end host 114, having removed the header and/or trailer. Messages 614, 624, 634 from the back-end host 114 are received without a header or trailer. The header and/or trailer are added 615, 625, 635 by the router gateway 126 and forwarded to the terminal adapter 122. The header and/or trailer are removed by the terminal adapter 112 before the response is provided to the Network Edge Device 110. While the figure depicts communications originating with the network edge device, the choreography between the network edge device and back-end host may involve some communications that seem to originate from the back-end host. The router gateway and terminal adapter establish communications between the network edge device and the back-end host and thereafter shuffle data between the two, without needing to understand whether the communications are requests, responses or otherwise. For completeness, a confirmation sequence 631, 632, 633 is depicted. Use of confirmation messages may be relatively uncommon with reliable protocols, but the architectures sufficiently flexible to provide confirmations as desired.

From the perspective of the network-edge device, the TA appears identical to the fixed line network to which it was previously connected. In one embodiment, network-edge devices supported by the TA modem interface will establish a connection to the TA in order to send a request and terminate the connection once a response is received, or after either a confirmation packet has been sent or after a subsequent request/response sequence relating to the current transaction is processed if either are supported by the protocol. In this embodiment, the TA will initiate a TCP socket to the router gateway upon power-up and keep it open until it is closed by either the wireless network operator or the router gateway. The communications interfaces for the router gateway process 413 and the package interface 423 both may utilize TCP/IP sockets. The TA may maintain a timer for communications with an active network-edge device, expiration of which will result in closing the socket connection after a prolonged period of inactivity by the network-edge device. No time-out processing is performed regarding requests and responses between the network-edge device and the back-end host by either the TA or the router gateway; this is left to the applications running on the communicating entities. The network-edge device or back-end host is responsible for terminating the conversation between each other—this is not the responsibility of the TA or the router gateway. Termination of a conversation between a network-edge device and a back-end host system does not necessarily mean that the connection between the TA and the router gateway or that an internal router gateway connection between a TA Interface process and a particular back-end interface process should terminate, it simply means that either the network-edge device or back-end host (whichever did not close the connection) needs to be informed of the event. The router gateway/TA protocol supports a particular Session Over message that can optionally be used for this purpose.

The router gateway will authenticate TAs as they access the system. Device authentication will be performed on two levels. At the application level, TAs will have a unique software "terminal ID" (TAUID) and a hardware "serial number" (HSN). At the network level, IPsec may be employed to provide authentication, confidentiality, integrity, access control, protection against replay attacks and limited protection against traffic flow analysis.

Again, the TAs are designed to emulate existing fixed line networks from the perspective of the Network-edge device. When a fixed line is being replaced by a TA, the Network-edge device remains unchanged from hardware, software and configuration perspective.

Looking again at FIG. 1B, when processing a transaction, the Network-edge device 110 connects to the TA 122 in the belief that it has connected to its associated back-end host system 114 via a fixed line network. The TA sends a packet and receives a response (optionally depending on the network-edge device and back-end host applications) without any knowledge of the TA to RG infrastructure. To make the infrastructure transparent, the TA adds a protocol header and/or trailer to requests received from the TA and sends them to the router gateway over, for instance, the wireless network. In an alternative embodiment, particularly when using concentrators, the terminal adapter may communicate with the router gateway over a high speed access medium, such as a DSL line, or wide area wireless, such as GSM, IS-95, 802.16 or 802.20. The router gateway determines the back-end host, which the Request is to be sent to, strips off the header and forwards the Request. The router gateway adds a header and/or trailer to responses received from the Back-End host before forwarding them to the TA.

Generally, it is expected that back-end handlers will always have sufficient resources (i.e., connections to the actual back-end host) to allocate to requesting TAs. In certain cases, the resources available to a particular back-end interface handler may be limited. For instance, the back-end host may restrict the number of concurrent connections that the handler can establish. Anticipating this possibility, the protocol may include an optional Session Initiation request/response message pair. Using this message pair, a TA can reserve a connection all the way through to the back-end handler before accepting a connection or data from a network edge device. Typically, one or more back-end handlers are mapped to each external address by the TA/RG resources. Use of this message is controlled on a per-external-address basis. Each external address has an associated flag in the mapping table indicating whether this message pair is to be used in conjunction with this specific external address.

In support of this protocol, we define two categories of addresses: external/soft addresses and hard addresses. We recognize the concept of source and destination address. Source and destination addresses are used in packets exchange between terminal adapters and router gateways. In one embodiment, source and destination addresses contain only hard addresses. External or soft addresses may optionally appear in a header or trailer to message. So-called external addresses refer to actual physical network information associated with network-edge entities. For example, the telephone numbers that an alarms system calls when triggered is referred to as an External Address. The ISDN number used to access a particular back-end host system is referred to as an External Address. An example of a Soft Address is a phone number such as 408-555-1212. Soft addresses are used to loosely refer to a type of handler. Soft addresses are intended for use when the destination has no associated External address. For example, the Administration process on a TA inserts the value ADMIN in the Soft/External address field of the messages that it sends if it does not have a Hard Address to insert in the frame header. A soft address constitutes a valid entry in a mapping table. An example of a Soft Address is a descriptor such as ADMIN. Hard addresses are used to directly reference a particular process on a particular machine. Hard addresses are made up from a particular MACHID and a particular PROCID. An example of a Hard Address is GW01:AMX01, where GW01 represents a particular machine within the over router gateway infrastructure (and maps to a unique IP address within that infrastructure) and AMX01 refers to a particular instance of an AMEX handler on that machine. With this background, we provide a more comprehensive routing overview.

Within a TA to RG network instance, routing is ultimately achieved through the mapping of Hard Addresses to already established back-end connections (e.g. TCP/IP socket, X.25, Frame Relay, etc.). In order to obtain actual Hard Addresses, the router gateway may be required to map External Addresses to Hard Addresses or Soft Addresses to Hard Addresses. In addition, in the event of Hard Address exception handling, the router gateway may be required to perform so-called "redirection." Redirection allows a session initiated with invalid Hard Addresses to continue and at the same time allows the network to automatically repair its Mapping Tables. Routing, address exception handling, the re-direction process and the various tables that the Router process must support are discussed next.

In an exception-free scenario, a modem handler (with a PROCID of MODH1) on a TA (with a MACHID of 00002) wishing to send a data packet to a particular back-end host interface handler already knows the Hard Destination Address for that handler—for example, in the case of a particular Vodafone back-end handler (PROCID=VODA1) running on machine number 7 of a particular router gateway instance (MACHID=00007) the Hard address may be 00007:VODA1. It would wrap the packet received from the edge device with frame header and/or trailer and fill in its own Hard Address 00002:MODH1 in the source address field and the destination hard address 00007:VODA1 in the destination field of the frame header or trailer. This information would allow all processes along the way (optional TA Router, router gateway, etc.) to perform the necessary routing, as long as no routing process in the chain decided that the Hard Destination Address was invalid.

Unfortunately, exceptions are encountered. A TA may not have a Hard Address corresponding to a particular External Address in its Mapping Table—it may only have a Soft Address or potentially just the External Address, or even no address at all, which may result in the message being discarded. Even if a TA has a Hard Address, the router gateway process may decide that the Hard Address known to the TA is no longer valid. If a router gateway detects that a frame has no Hard Destination Address, it may follow this protocol: It checks the Session Flag in the message frame header to see if this particular message is the first in a new session. If the Session Flag is not set, the router gateway may discard the message. It ignores the message because it has no way of knowing how previous messages in this sequence were routed. If the Session Flag is set, the Router process checks the frame trailer to see if there is a Soft Address present. If there is a Soft Address present, the Router process switches to Redirect-based exception handling as discussed below. If a Soft Address is not present, the Router process checks the frame trailer to see if there is an External Address present. If an External Address is not present, the Router may discard the packet. If there is an External Address present, the Router process switches to Redirect based exception handling as discussed below.

If a router gateway detects the presence of a frame that has an invalid Hard Destination Address, it may follow this protocol: It checks the Session Flag in the message frame header to see if this particular message is the first in a new session. If the Session Flag is not set, the router gateway may discard the message. It ignores the message, because it has no way of knowing how previous messages in this sequence were routed. If the Session Flag is set, the Router process checks the frame trailer to see if a Soft Address is present. If there is a Soft Address present, the Router process switches to Redirect based exception handling as discussed below. If a Soft Address is not present, the Router process checks the frame trailer to see if there is an External Address present. If an External Address is not present, the Router discards the packet. If there is an External Address present, the Router process switches to Redirect based exception handling as discussed below.

A Registration Request/Response message pair can be used by a TA to obtain a TAUID (MACHID for a TA) from the router gateway Administration Server. The fundamental difference between a Registration Request and the other message types supported by the router gateway is that the TAUID (used as the MACHID in the frame header Hard Source Address MACHID:PROCID) is not available to the TA Admin process at that point in time. The MACHID component of the Hard Source Address will be filled with a number, for instance a portion of the TA hardware serial number or the Session ID, for a Registration Request. In an alternative embodiment, a random or pseudo random number could be used for the HSN. The Administration Server will send a Session-Over message (using the Destination ID received in the Hard Source ID of the Registration Request) after it sends the Registration Response. This will result in the Router process on the Gateway and TA removing the entries that were created when the Registration Request was being transported.

In a number of scenarios, a Router process may decide that there is a Hard Destination Address error. If a Router process decides that a Hard Destination Address error has occurred in the initial message of a new session, it attempts to locate a valid Hard Destination Address based on the Soft or External Addresses from the message frame header or trailer. The Router process detects the fact that it is dealing with the first message in a session using the first message flag in the frame header or trailer. Redirection cannot start in the middle of a session—this is an error condition.

If a valid Hard Address is located, the router process may follow the Redirection protocol: It generates a Redirect message (for instance, Redirect code=19) and sends it to the Router process on the machine that generated the original message via the Hard Source Address from the frame header of the original message. It reads the Session ID from the frame header of the original message and creates a dynamic entry in the Redirect table containing the following fields—the Hard Destination ID that was contained in the original message, the valid Hard Destination ID that it has calculated, the Hard Source ID that generated the original message and the Session ID. The Router process on the machine that originated the original message in this session should receive the Mapping Table Update and inform the originating process that an update has occurred—note that the expression "originating process" as used herein refers to the process residing on the machine that sent the message with the invalid or missing Hard Address that triggered the Redirect message, not to the process that generated the Redirect. The originating process should then use the new Hard Destination Address from that point onwards. As subsequent messages (belonging to this session) containing the invalid Hard Destination Address are received by the router gateway process, it uses the Hard Source ID and Session ID to find the correct Hard Destination Address from the Redirect table. Once the router gateway detects that the originator of the messages has begun using the valid Hard Destination Address for this session, it clears the Redirect Table entry using the Session ID from the frame header as its key.

Routing has been described above with reference to the Mapping Table, the Router Table and the Redirect Table. Upon startup (or based on an update notification), a Router process reads the Mapping Table from the system database. Once successfully started, a Router process will listen on a pre-configured TCP/IP port number. It will begin accepting connections from the various entities listed above and will dynamically build and maintain the Router Table. The Redirect table is dynamically created and maintained by a Router process in order to manage exception processing. Router processes are responsible for managing the three distinct tables for mapping, routing and redirection. Note that the Router process in a TA manages router and mapping tables but does not manage a redirect table.

The Mapping Table is used by each Router process to map between either External Addresses and Hard Addresses or Soft Addresses and Hard Addresses. The Mapping Table is static in the sense that it only changes when an operator adds or removes internal or back-end interface processes. The following layout describes the mapping table structure:

| Entry | Soft/External Address | Hard Address (MACHID: PROCID) | Description |
| --- | --- | --- | --- |
| 1 | 408.803.3344 | GW01:AMX01 | Gateway 1, Amex |
| 2 | 888.934.8762 | GW01:MCD01 | Gateway 1, Mastercard |
| 3 | 912.435.6672 | GW01:VSA01 | Gateway 1, Visa |
| 4 | 912.435.6672 | GW02:VSA01 | Gateway 2, Visa |
| 5 | 234.667.8903 | GW02:DSC01 | Gateway 2, Discover 1 |
| 6 | 234.667.8903 | GW02:DSC02 | Gateway 2, Discover 2 |
| 7 | 888.934.8762 | GW03:MCD01 | Gateway 3, Mastercard |
| 8 | 234.568.89.90:32 | GW03:JCB01 | Gateway 3, JCB |
| 9 | 123.9.12.41:4567 | GW03:APH01 | Gateway 3, AirPlus Host |
| 10 | ADMIN | GW01:ADM01 | Gateway 1, Admin |
| 11 | ADMIN | GW02:ADM01 | Gateway 2, Admin |
| 12 | ADMIN | GW03:ADM01 | Gateway 3, Admin |

The Routing Table maps Hard IDs to socket connection IDs. It is dynamically generated by each Router process as it detects TAs or internal/back-end handlers connecting to it and utilizing its routing capabilities. A routing table tracks the hard IDs associated with all local socket connections, in support of forwarding a given message frame to its destination. At startup, a router knows its own ID. This is a configuration item. A router learns, through connection, the hard address of direct connecting processes. A router learns, through examination of traffic, the Hard Addresses of remote processes. A router process will grow its routing table when a recognized Hard Source Address causes a confirmed entry to be created. The following layout describes the routing table structure:

| Entry | Hard ID | SD | State | Confirm | Description |
| --- | --- | --- | --- | --- | --- |
| 1 | TA001:MDM01 | 12 | Unused | Unused | Modem Handler 1 on TA 001 |
| 2 | TA001:ADM01 | 13 | Unused | Unused | Admin Handler on TA 001 |
| 3 | GW01:ADM01 | 14 | Unused | Unused | Admin Handler on GW 01 |

-continued

| Entry | Hard ID | SD | State | Confirm | Description |
|---|---|---|---|---|---|
| 4 | GW01:AMX01 | 15 | Unused | Unused | AMEX Handler on GW 01 |
| 5 | GW01:VSA01 | 16 | Unused | Unused | Visa Handler on GW 01 |
| 6 | *****:****** | Unused | Unused | Unused | Default Route (Unused) |

The Default Route entry shown above is conceptually intended to deal with a situation where a Router process receives a message for which it cannot find a definitive route. The router gateway system need not support the concept of a Default Route as per this definition. The TA Router process establishes a connection to the router gateway at startup and immediately tries to re-establish it in the event of a connection failure. All messages received from other TAs (in a multiplexed scenario) or from its own network-edge device handlers are forwarded to the router gateway over the router gateway connection so it is a de facto "default connection;" no-lookup is performed in order to determine if a particular message should be sent over it. Routing Table lookups are performed in order to route messages received on the celco connection.

Redirection is discussed above. A redirect table, related to a routing table, supports redirection of a given session's message frames (until a session-over message is received or a timeout occurs). The following layout describes the redirect table structure:

| Entry | Original Hard ID | Redirect Hard ID | Session ID |
|---|---|---|---|
| 1 | GW01:VSA01 | GW02:VSA01 | TA002:MDM01:SESS01 |
| 2 | GW02:DSC01 | GW02:DSC02 | TA001:MDM01:SESS03 |

The Session ID field in the message frame header is used for Router process 413 Hard Address Exception Handling, as described above, and for mapping of messages to conversations with external network edge devices. The following discussion provides additional detail regarding the mapping of messages to conversations with external network edge devices/systems and the structure of a sample Session Table.

One usage of the Session ID field in the message frame header is to provide individual router gateway handlers that communicate concurrently to multiple external network edge devices or systems to map messages to the individual connections. For example, consider a scenario in which two cash registers are connected to two separate serial ports on a particular TA and that these serial ports are managed by a single TA serial port handler. Both of these cash registers are capable of processing cellular prepaid top-up requests against a Cingular Wireless prepaid top-up host. Assume also that the router gateway to which the TA connects has a single Cingular Wireless back-end handler process that can talk to two different connections on the Cingular host at the same time. When the TA serial port handler accepts a connection from cash-register number one on serial port one, it generates a unique session-ID "X" and assigns it to this connection on serial port one. It sends the session-id in the frame header of the message containing the prepaid top-up request generated by the cash register to the Cingular Host handler running on the router gateway. The Cingular Host handler initiates a connection to the Cingular gateway on connection one and makes a link between the session ID "X" received in the frame header and connection one. Just after accepting the connection on serial port one, the TA serial port handler accepts a connection from cash-register number two on serial port two. It generates a unique session-ID "Y" and assigns it to this connection on serial port two. It sends the session-ID in the frame header of the message containing the prepaid top-up request generated by the cash register to the Cingular Host handler running on the router gateway. The Cingular Host handler initiates a connection to the Cingular gateway on connection two and makes a link between the session ID "Y" received in the frame header and connection two.

When a response comes back on connection one to the Cingular host, the router gateway Cingular host handler creates a message containing the received data, places the session ID associated with that connection in the frame header and copies the Hard Source Address from the original request into the response message Hard Destination Address. When the response arrives at the TA serial port handler, the handler is able to match the packet to the correct port using the session ID without any knowledge of the contents of the packet.

A session table contains a handler's record of its active sessions and maps these sessions to physical connection identifiers. The following layout describes the session table structure:

| Entry | Session ID | End Point Hard ID | State | Connection ID |
|---|---|---|---|---|
| 1 | SESS01 | TA002:MDM01 | Unused | 11 |
| 2 | SESS03 | TA001:MDM01 | Unused | 12 |

Sample Message Flows

Sample message flows are useful to apply the protocol described above. We begin with two examples of administrative message flows, for registration and for sign-on. In the first sample of a registration message flow, the two communicating entities are Admin Process on TA001:ADM01 and Admin Process on GW01:ADM01. This sample flow can be seen in FIG. 7, in messages 703, 704. The processes involved are identified in FIGS. 4 & 14. As the initiator of the Registration session, the TA Admin process 415 generates an information packet containing registration-specific data. The Admin process will wrap this packet within a frame including its hard address (MACHID and PROCID), the soft address of the destination (i.e., ADMIN) a unique session ID and a flag for the first message frame. It will then pass the frame to the local router process 413. (Note that since the machine has not yet received its MACHID, it will use some or all of its hardware serial number). The local router process 413 will receive the frame, note the lack of a Hard Destination Address, and check the frame data area for a soft address. Lacking such a mapping in its own tables, the router process will finally forward the frame through its default route (socket).

The (gateway) router process 413 at the other end of the socket will receive the frame 703 and note the absence of a Hard Destination Address. It will check the frame data area for the existence of a soft address, find the value "ADMIN", map that to a related hard address, and forward the packet to the indicated handler. The Gateway Admin process will parse the information packet contained in the message frame, process the resultant information, and build a response packet. This response packet will contain the actual MACHID (TAUID) for the successfully registered TA. The Gateway Admin process 415 will then forward the response packet, wrapped in a frame along with the Session ID, its own hard ID (as source) and that of the originating process (as destination), to the local router process. Note that the Session ID is generated by the network-edge handler process that originated the session, it generates a unique Session ID and includes it in the frame header. All processes that generate messages that pertain to this session are required to reuse the Session ID from the frame header. The local router process will note the destination ID, look up the corresponding socket in its mapping table, and send the frame down that socket.

The router process on the TA will receive the frame containing the response packet 704, note the destination ID, look up the corresponding socket in its mapping table, and send the frame down that socket. The admin process on the TA will receive the frame containing the response packet, unwrap the response packet, parse its content and process as required.

Another example of an administrative message flow is a sign-on request and response. The message frame flow resembles the flow for registration, above. As the initiator of a Sign-On session, the TA Admin process generates an information packet containing sign-on-specific data. The Admin process will wrap this packet within a frame including its hard address (MACHID and PROCID), the hard address of the admin process last communicated with, a unique session ID and a flag for the first message frame. It will then pass the frame to the local router process. The local router process will receive the frame, note the existence of a Hard Destination Address, look up that address in its routing table, and forward the frame through the indicated socket.

The (gateway) router process at the other end of the socket will receive the frame, note the presence of a hard ID, and attempt to look up the socket associated with that ID. If the association is still valid, the packet will be forwarded through the indicated socket. If the socket is no longer available, then a redirect event will occur. In this case, the router will identify another handler of the same class and forward the message frame to it for processing. Additionally, an entry will be generated in the redirect table for the routing of further packets for the given session, and a redirect message will be generated and sent back to the originating process so that it may update its own mapping table.

The Admin process will parse the information packet contained in the message frame, process the resultant information, and build a response packet. It will then forward the response packet, wrapped in a frame along with the session ID, its own hard ID (as source) and that of the originating process (as destination), to the local router process. The local router process will note the destination ID, look up the corresponding socket in its mapping table, and send the frame down that socket.

The router process on the TA will receive the frame containing the response packet, note the destination ID, look up the corresponding socket in its mapping table, and send the frame down that socket.

The admin process on the TA will receive the frame containing the response packet, unwrap the response packet, parse its content, and process as required.

An example of a data message flow includes a Modem Handler on TA001:MDM011 and CreditCardY Process on GW01:AMX01. The modem handler on the TA, upon start of a conversation with (one of) its modems, will ascertain the (soft) physical address indicated by the edge device and check its mapping table (or that of some other process) for an associated hard address. It will concurrently collect some amount of data from the edge device, wrap that data in a packet, wrap that packet along with a session ID, its own hard address (as source) and the ascertained hard address (as destination) or soft address (as data) in a frame and pass the frame to the local router process.

The local router process will receive the frame, note if there is no Hard Destination Address given, and (if not) check the frame data area for a soft address. Upon finding such an address, the router process will search in its mapping table for a corresponding hard address. If found, it will update the destination address of the frame with that hard address and generate a redirect message. If no soft address is found, the message frame is simply forwarded through the default route.

The router gateway process at the other end of the socket will act in similar fashion—first noting whether or not the received frame has a Hard Destination Address, and if not, noting whether or not there is a soft address in the data section, which it can check against its own mapping tables. In the absence of either (typically an error condition), the frame will be passed to the local admin process, or some such default handler. When a mapping is found for the first packet of the session, an entry is made in the redirect table for the session, and the frame is routed to the appropriate host handler which will unwrap the packet from the frame, parse its content (including the session ID) and process as required.

Consider the case of the redirect message (sent on the redirect event) reaching the originating handler after it has already forwarded the next message frame of the session. When this second frame, following the same path as the first, reaches this router, the record in the session table will cause the router to forward that packet to the same handler process. Subsequent packets of the same session, should they arrive without a hard address enclosed, will be forwarded in the same fashion.

Upon receipt of a message frame from the same session with an enclosed Hard Destination Address, the router can forward it and subsequent (similarly identified) messages directly.

Any response messages generated by the destination handler for the given session will contain hard addresses for both source and destination and will be routable to the originating handler. The method also involves clearing out the redirect entries once their usefulness has passed. A session frame containing an end-of-session flag or a timeout of sufficient duration are alternative stimuli for the clearing out.

These message flow examples help illustrate aspects of the present invention.

Automated TA Administration

Managing the distribution of bug fixes and configuration file/software updates to a large installed base of embedded devices can be costly and resource intensive. One of the functions of the router gateway is to act as an automated server for the distribution of these types of updates. TAs are configured to send version information to the router gateway in a special Version request type. This section provides an overview of the various mechanisms used during the TA administration process.

In one embodiment, administration sub-systems are driven by the TAs, for the reasons discussed above. The router gateway does not initiate a connection to a TA, because this may not be possible with some TA modems or with some cellular services. Once a TA has opened a socket to a router gateway (either directly or via another TA-established connection in a multiplexed scenario), the router gateway can initiate the exchange of request/response pairs with that TA.

Remote TAs typically connect to the router gateway for three reasons; first, to transfer information between the network edge device that it is serving (i.e., a soda dispensing machine) and the router gateway. Once a TA has connected to a router gateway, data exchange can be bi-directional. The initial embodiment focuses on applications in which the network-edge device connected to a TA initiates all conversations, but the architecture does not preclude a router gateway from requesting a TA to initiate a connection to a network-edge device.

Second, TAs connect to RGs to exchange Administration messages with the router gateway. Different categories of Administration requests include Sign-On/Sign-Off messages, Echo-Test requests, version Information requests, configuration update requests and statistics upload requests. In the event that a particular TA has not been requested to process requests by its associated network-edge device(s) for a configurable period, the TA can be configured to send Echo-Test messages to the router gateway on a timed basis. The router gateway can be configured to send Echo-Test Requests to a TA; the TA must respond with a valid Sign-On Response.

A router gateway will determine if a given TA requires a configuration update, and will either include the optional version request field in a message destined for that TA or forward a dedicated version information request to that TA. Upon receipt of either the version request field or a dedicated request for version info, a TA will package its version information and forward it to the router gateway. Upon receipt of a TA's current version information, the router gateway will compare the version information with the TA configuration information stored in the router gateway database. If the router gateway determines that the TA requires configuration updates, it will inform the TA of the differences in the form of a configuration update message. A TA, upon successful completion of a configuration update, will send its current version information to the router gateway.

Third, TAs connect to RGs to download configuration/software updates via the package interface. Note that the instruction to generate a configuration/software update Administration request is actually included in an optional field in a previous response message (e.g., a response to either a sign-on, echo test or an actual network-edge device response packet). The message flow in the case where a configuration update Administrative request is initiated via an Echo-Test response is illustrated in FIG. 7, and the message flow in the case where the configuration update process is initiated directly by the router gateway Admin process is illustrated in FIG. 8. These figures differ in the type of response 702, 802 that the router gateway 126 is sending to the TA 122 when it sets the update flag to prompt the TA to request a package download. The type of response depends on the type of request, such as an echo-test 701 or an edge-device request that the TA wraps and forwards to the RG. In both message flows, the TA initiates a package download 705 and receives a package file 706 in response.

It is useful for the router gateway architecture to run in a clustered hardware environment, run in a clustered database environment and be expandable to support multiple concurrent site operation, to guard against environmental failure. It is not necessary to provide all of these features in a single embodiment. One embodiment of the router gateway is designed to operate in a clustered hardware environment with virtually no coupling between the individual hardware units. The system database is designed to operate on its own hardware platform remote from the actual router gateway packet processes as highlighted in FIG. 4. Incoming TCP/IP socket requests may be received by a disk-less router adapted to incoming Network Address Translation (NAT), performing Round-Robin load balancing of incoming requests across multiple private back-end IP addresses and detecting and removing failed back-end systems from its list of valid back-end system addresses.

FIG. 9 provides an overview of clustered hardware interactions. The easiest clustering involves one to "N" identical, Linux platforms (from the perspective of hardware, operating system and application software). Non-identical platforms also can be used, with appropriate adjustments. Non-Linux platforms, such as Unix or Windows platforms, can be used. Each of the clustered machines 910, 920 may contain two Ethernet adapters each connected to a separate private address range IP LAN and configured with a unique, static private IP address. Alternatively, a single adapter can be configured for two or more IP ranges. For example, two LANS (192.168.0.0 and 192.168.1.0) are established. The LAN with the network address of 192.168.0.0 is dedicated to incoming connections and the LAN with the network address of 192.168.1.0 is dedicated to the system database. Each of these machines has access to a stand-alone database cluster residing on a private IP network. In FIG. 9, the processes running on the clustered machines are numbered in parallel to numbering of FIG. 4.

TAs are configured to connect to an externally accessible IP address on the external interface 905 of a disk-less router 907. The Router performs incoming NAT translation and maps the incoming connections to the private IP address of one of the back-end hosts on the 192.168.0.0 network. It is coupled to the clustered machines through a hub, switch, router or similar device 909. The router also may provide load balancing. If a particular machine fails or is shutdown for any reason, all connections that had been established between TAs and that machine will be disconnected. These TAs will attempt to re-establish a connection to the external IP address of the external interface of the disk-less router, which will, in turn, make a connection to one of the remaining machines. Again, the Router process on an RG would be configurable to set a maximum number of socket connections that it would accept. The disk-less router will automatically assign connections above this limit to an alternate machine. One suitable disk-less router is the Linux Router Project (LRP). Second and additional external incoming IP addresses on the same or separate Internet carrier connections can be mapped to the cluster, using additional disk-less routers connected to either the same or a separate private IP network.

The router gateway database is designed to operate using a clustered database environment with virtually no coupling between the individual hardware units. The system database is designed to operate on its own hardware platform, optionally remote from the actual router gateway packet processes as indicated by FIG. 4. Alternatively, the system database could share resources with gateway processes or could reside on a machine that functions as a back-up router gateway. In the separate hardware platform configuration, the system database resides on a dedicated private network.

Incoming database connection requests are received by a disk-less router capable of performing incoming Network Address Translation (NAT), performing Round-Robin load balancing of incoming requests across multiple private back-end IP addresses and detecting and removing failed back-end systems from its list of valid back-end system addresses.

The clustered database environment may parallel the clustered host environment, as depicted in FIG. 10. One to "N" identical, Linux platforms (from the perspective of hardware, operating system and relational database software) are installed. Each of these machines 1010, 1020 contains one Ethernet adapter connected to a separate private address range IP LAN and configured with a unique, static private IP address—e.g. 192.168.1.1. Router gateway processes requiring access to the system database are configured to connect to an IP address 1006 on the private network. The Router 1007 performs incoming NAT translation and maps the incoming connections to the private IP address of one of the back-end hosts on the 192.168.1.0 network. Each of the database instances 1018, 1028 makes a connection to the system RAID disks 1030. If a particular machine fails or is shutdown for any reason, all connections that had been established through that machine to the database will be disconnected. The router gateway processes will automatically attempt to re-establish a connection to internal IP address 1006 of the disk-less router which will, in turn, make a connection to one of the remaining machines.

Elaboration on TA-RG Protocol

This application protocol is designed for the transportation of packets between agents in the TA adapter system, (e.g., between a TA and a Gateway Router, or between two TAs). A TA can either form a new packet by encapsulating modem input from a network edge device directly, or forward a packet originated by another TA in the system. This application protocol will support connection-mode transmission of protocol packets between TA agents and the Gateway Router for an established session on the system network. In this context, connection-mode includes a virtual circuit which is established between the starting point of the transmission and the Gateway Router, such that all packets transmitted during that session will follow the same route through at least parts of the system.

Terminal adapters (TAs) will be able to read and interpret the protocol packets described below. TAs are responsible for, among other things, routing these protocol packets on toward their destination from internal processes and network-edge devices. These links may support full-duplex simultaneous bi-directional operation. Basic Encapsulation is used between TAs and RGs. The Link Control Protocol is the responsibility of the Network and is independent of the application layer. The Network Control Protocols employed are the responsibility of the network and are independent of the application layer.

In the discussion that follows, the following terms are useful to understand. A datagram is a unit of transmission packet. It is the basic unit of encapsulation, which is passed across the interface between the network layer and the data link layer. A packet is usually mapped to a frame; the exceptions are when data link layer fragmentation is being performed, or when multiple packets are incorporated into a single frame in the network layer (such as IP). A datagram may be encapsulated in one or more packets passed to the data link layer. This definition is different than that given in other contexts for describing the independent packets that traverse a connectionless network. Here, the datagram may traverse either a connection-like network or a connectionless network, depending on the history of the session.

A destination address (DSTID) is the hard address of the receiving end of a framed message.

An external address is a phone number, ip:port, x.25, etc.

A frame is the unit of transmission at the data link layer. A frame may include a header and/or a trailer, along with some number of units of data.

A handler is a process capable of acting as an endpoint in a session.

A hard address is a specific internal address, for instance, in MACHID:PROCID format.

A machine ID (MACHID) is an unique gateway-assigned identifier for a specific machine, such as a TA or gateway CPU.

A packet is the basic unit of encapsulation, which is passed across the interface between the network layer and the data link layer. A packet is usually mapped to a frame; the exceptions are when data link layer fragmentation is being performed, or when multiple packets are incorporated into a single frame.

A peer, in context, may be the other end of the link.

A process ID (PROCID) uniquely identifies a particular process for a given MACHID.

Redirection is a router operation involving changing the destination address of a (series of) framed message.

A router is a process capable of transferring session information between endpoints.

A session is a set of framed messages as defined by the originating handler and agreed to by the destination handler.

A session flag is an indicator of first framed message of session, potentially used by router to enable redirection. Only packets with this flag set can be assigned a new redirection.

A session ID is a unique identifier (for a given originating handler) defining a set of framed messages.

Silently discard means to discard the packet without further processing. Optionally, the implementation may provide the capability of logging the error, including the contents of the silently discarded packet, and record the event in a statistics counter.

A soft address is a non-specific address identifying a class of handler such as an external address or internal objects like admin handlers, etc.

A source address (SRCID) is the hard address of the originating process of a framed message.

A TAUID is a deprecated term for a Machine Identifier (MACHID).

In certain contexts, a transmission is a unit of data that is to be exchanged between a TA and the Gateway Router. A transmission may consist of multiple packets. The Gateway typically assembles the complete transmission before passing it on to the relevant back-host system.

A virtual circuit is another name for a "connection mode" operation, where every packet in a given connection session is transmitted over at least part of the same route.

At a frame level, FIG. 11 depicts an encapsulation scheme and fields transmitted to implement that scheme. The start flag 1102, version 1104 and frame length 1106 are self-explanatory. Addressing is implemented in terms of "Hard Addresses" (HA) and "Soft Addresses" (SA). The SRCID 1108 and DSTID 1110 fields in the frame header each contain an HA. A Data Optional Field in the header contains the SA. Routing is implemented using these addressing fields together with the SessionID field 1112. A hard address includes a machine identifier <MACHID> identifying the machine and a process identifier <PROCID> identifying a process on the given machine (MACHID). A soft address is a meta address (e.g., a telephone number, an X.25 address, a system mnemonic (ADMIN)) used as an alias for the destination address.

The Session Identifier <SessionID> 1112 is a unique string generated by the originating TA process. It is used in the following ways by agents handling the message: by the originating TA process in delivering any response messages back to a network edge device; by the terminal Host Handler process in delivering any response messages back to a sender; and by TA Handler processes when handling exceptions in their routing algorithm.

Reviewing the fields in order, the Session Flag Field in 1114 is a 1-byte fixed field entry (0xFF) that marks the beginning of each packet. The Version Field 1104 is a 1-byte field that conveys the version number of the frame protocol. The frame protocol wraps the Packet protocol package, which contains the Data fields. The Frame Length field 1106 gives the length of the entire frame, starting with the Start Flag and ending with the LRC. The high order 8 bytes of the SRCID 1108 is filled with the Machine ID of the machine running the originating process. The low order 5 bytes is filled with the process identifier of the process initiating the message. This field contains a "Hard Address". The DSTID 1110, if filled with anything other than default BLANKS (0x20), is filled in the same manner as the SRCID, above. This field contains a "Hard Address". The Session ID 1112 is a number unique to the generating end TA process that is associated with the connection channel the NED message came in on, and can be used to return a response message to that same connection channel if necessary. The Packet Length Field 1116 is a two byte binary field that represents the length of the following Packet Data message. The Packet Data Field 1118 has a length of zero or more octets. The Packet Data field contains the datagram for the message being conveyed by the frame level protocol described in this section. It is the payload, so to speak. The Options Length Field 1120 is a 1-byte binary field that represents the length of the following Options Data message. The Options Data Field in 1122 includes optional data elements, which may include a 1-byte type field, a 1-byte length field, and a corresponding data field. In one embodiment, defined option types include RECORDROUTE, designed for each TA to append its network address (SRCID); TIMESTAMP designed for each TA to append its network address (SRCID) and timestamp; and SRCCALLNO, which is the actual "number" that the NED uses to contact its destination host (e.g., a PSTN). The Stop Flag Field 1124 is a one byte fixed field entry (0xFE) that marks the end of each packet. The LRC Field 1126 is a Longitudinal Redundancy Check byte that is used to insure the data integrity of the information message exchanged through the system. An LRC character is generated and appended to all data packets in order to detect and recover from transmission errors which might result as a result of line interference. An LRC is generated by taking the 8-bit EXCLUSIVE-OR (Binary ADD with no Carry) of all bytes starting with the Start Flag and including the final Stop Flag of the message. The LRC field itself is excluded from the calculation of the LRC. Other forms of integrity code or forward the error correction code could be used in lieu of LRC, such as CRC or Reed Solomon encoding.

Link Operation

In order to establish communications over a link, the TA sends a valid Administration Sign-On packet to the ADMIN address. This is a so-called "Soft Address" that is understood by the system to be the Administration Server that services these requests. The router gateway will consider the link to be up ("link up") until the TA sends a valid Administration Sign-Off message or until some external event occurs (an inactivity timer expires or network administrator intervention).

The link between the TA and the router gateway can terminate at any time. This might happen because of the loss of carrier, authentication failure, link quality failure, the expiration of an idle-period timer, or the administrative closing of the link.

The receiver of a Sign-Off request should wait for the peer to disconnect, and should not disconnect until a Sign-Off Response has been sent and a pre-configured timer has timed out. It is valid for the TA to send a new Sign-On Request without dropping the physical link. The Gateway Router should not drop the physical connection after sending a valid Sign-Off response unless explicitly configured to do so. Packets received from a TA considered to be in a signed-off state MUST be silently discarded.

At the Packet Level, this protocol includes four classes of packet data: 1) Administration packets used to establish and maintain a link—Sign-On Request/Sign-On Response, Sign-Off Request/Sign-Off Response, Echo-Test Request/Echo-Test Response; 2) Configuration packets used to request a configuration or software update—Configuration Update Request/Configuration Update Response, Error Response; 3) Message Transmission packets—Packet Transmission Session-Over, Error Response; and 4) Registration packets—Registration Request/Registration Response.

The protocol packet format is depicted in FIG. 12. The Protocol Field 1202 is a 2-byte ASCII field, containing characters in the range "0" to "9" and "A" to "F". Its value identifies the datagram encapsulated in the Information field of the packet. Additional values will be added in future versions of the specification. The Version Field in 1204 is a 1-byte field that conveys the version number of the information packet protocol. The information packet protocol wraps the Data fields. The Code field in 1206 is two bytes in length, and identifies the type of Packet. When a packet is received with an unknown Code field, it is silently ignored by the receiver. The following code field values may be recognized:

| ASCII | HEX | TYPE |
|---|---|---|
| 01 | [0x30][0x31] | Registration Request |
| 02 | [0x30][0x32] | Registration Response |
| 03 | [0x30][0x33] | Sign-On Request |
| 04 | [0x30][0x34] | Sign-On Response |
| 05 | [0x30][0x35] | Sign-Off Request |
| 06 | [0x30][0x36] | Sign-Off Response |
| 07 | [0x30][0x37] | Echo-Test Request |
| 08 | [0x30][0x38] | Echo-Test Response |
| 09 | [0x30][0x39] | Version Report Request |
| 10 | [0x30][0x30] | Version Report |
| 11 | [0x31][0x31] | Configuration Update |
| 12 | [0x31][0x32] | Packet Transmission |
| 13 | [0x31][0x33] | Error Report |
| 14 | [0x31][0x34] | Session Over |
| 15 | [0x31][0x35] | Command Request |
| 16 | [0x31][0x36] | Command Response |
| 17 | [0x31][0x37] | Session Init |
| 18 | [0x31][0x38] | Session Close |
| 19 | [0x31][0x39] | Redirect |

The SEQ ID field 1208 is always set to a (relatively) unique number. If there is only one message in the packet sequence (i.e., the sequence length is 1), the SEQN field following is set to −1. If there is a sequence of messages that belong together, they share the same SEQ ID. In that case, the SEQN field starts at 1, and increases by 1 to the last value, which is then made negative to indicate the last sub-message. This number is generated by the source TA. The SEQN field 1210 contains a sequence number indicating the current packet's position in an overall transmission. The SEQN is encoded in hex as 16 bits with the most significant bit (MSB) arriving first (on the left hand side) and the least significant bit (LSB) arriving last (on the right hand side). The LSB represents $2^0$ (i.e. SEQN=1), the MSB represents $2^{15}$ (32,768). The max number of packets that the protocol can therefore use in any one overall transmission is $2^{15}+2^{14}+\ldots 2^0$ (65,535). A value of 0xFFFF indicates that this packet is the only (or last) packet in the sequence. In one embodiment, the max length of an individual DATA option is 255 octets. Within this protocol, an individual packet can contain multiple DATA option fields up to a total packet length of 65,535 octets. The max amount of data that an individual transmission (made up from multiple individual packets) can contain is therefore 65,535*65,535=2.127e37. Large transmissions of this nature, such as file transfers, are unlikely to occur—for example, it is envisaged that a file transfer would be accomplished using multiple transmissions. The Data field 1212 is zero or more octets, as indicated by the Length field in the Frame header. The format of the Data field is determined by the Code.

One pair of code field values identify a registration request and response. Upon power-up, TAs are designed to send a Registration Request to a default Registration Server process on the network to obtain a valid TAUID and Gateway Router address. The address of the default Registration Server is specified in the configuration file first installed at the TA site. If the Registration Server address is missing or if the TA fails to contact the Registration Server within a configurable number of attempts, the TA will send a Registration Request to a "last resort" URL retrieved from its BIOS in order to obtain the contact details (URL, port number) of a valid Gateway Router. The registration process includes sending the factory configured hardware serial number (HSN) to the Registration Server, and receiving a TAUID in response. The Registration Server will return a valid TAUID if it recognizes the TA's HSN. Upon receipt of a Registration Request, an appropriate reply is transmitted by the Registration Server. The options field for registration request is variable in length. It contains information such as the TA's hardware serial number (HSN).

If every Option received in a Registration Request is recognizable and all values are acceptable, then a Registration Response is generated. On receipt of a Registration Response, the Identifier field in the Options field of the response message should match the SEQ ID field in the last transmitted Registration Request. Invalid Registration Response packets may be silently discarded. The Options field of a registration response is variable in length. A Response Code (RSPCD), a reason code, contact information for the Gateway Router that the TA should use in the future (GWADDR) and a valid TA serial number (TAUID); this is an 8-byte SRCID field encoded in ASCII using the hex character set "0"-"9", "A"-"F". The maximum number of SRCIDs that the protocol can support is $16^8$=4,294,967,296. It further may include an identifier that contains the SEQ ID of the Registration Request.

Another pair of code field values identify a sign-on request and response pair. To open a connection, an implementation transmits a Sign-On request. Upon receipt of a Sign-On Request, an appropriate Sign-On Response is transmitted. The options field of a sign-on request is variable in length. Valid options for this request type include the TA hardware serial number (HSN), which is burned into the TA at the factory, and the TA SIM data (SIMDAT).

If every Option received in a Sign-On Request is recognizable and all values are acceptable, then the implementation transmits a Sign-On Response. The Options field is variable in length, and may include the hardware serial number of the TA that sent the request (HSN), a response code (RSPCD), a flag indicating whether the TA should send a Version Report message, and an identifier that contains the SEQ ID of the sign-on request.

Another pair of code field values identify a sign-off request and response pair. An implementation wishing to close a connection transmits a Sign-Off request. Upon reception of a Sign-Off Request, an appropriate Sign-Off Response is transmitted. The options field of a sign-off request is variable in length. Valid options for this request type include a reason code (RSNCD) for the signoff.

Another pair of code field values identify an Echo-test request and response. A TA wishing to test a connection (or keep a connection active in environments where a wireless operator can close a connection based on an inactivity timer) may transmit an Echo-Test Request. Upon receipt of an Echo-Test Request, an appropriate reply is transmitted. The options field is variable in length, and may include meta-data. An Echo Test Request containing the ADDR option is a special case. In this case, the TA is requesting that the Gateway Router establish a connection to the back-end identified by the ADDR option (if a connection does not already exist). In this case, the Gateway Router should wait for a response from the back-end handler before sending an Echo Test Response. If every Option received in an Echo-Test Request is recognizable and all values are acceptable, then the implementation transmits an Echo-Test Response. The Options field is variable in length, and may include a flag indicating whether the TA should send a Version Report message and an identifier field that contains the SEQ ID of the Echo-test request.

Another pair of code field values identify a version report request and report. A Gateway Server sends a Version Report Request to a TA in order to obtain a Version Report back detailing the configuration of that TA. Upon receipt of a Version Report Request, a TA replies with a Version Report. The Options field is variable in length, and may contain items such as an address of a version server.

A TA sends a Version Report in order to pass its application and configuration version information to the Gateway Router. This message is usually sent in response to a Version Report Request. No reply is required from the Gateway Router to a Version Report message. The options field is variable in length, it contains the TA's configuration and application version information.

A configuration update may be used by the Gateway Server to help keep track of TAs' version configurations. When the Gateway Server determines that the TA requires a configuration update, it will send the TA a Configuration Update message containing the version update information needed for the TA to reconfigure. The options field is variable in length, and contains information regarding the version numbers of the configuration files and applications that the TA needs to update to.

A code field indicating a packet transmission delivers data from a network-edge device to back-end host. There is no corresponding response packet. A TA or Gateway router receiving an invalid packet transmission request should notify the sender with an error response containing a reject response code. The options field is variable in length, and it includes information such as the address (phone number, X.25 address, etc.) that the network-edge device is attempting to call, the data that the device is attempting to send, etc., a Connection Identifier identifying the channel on the originating TA that connects to the sending Network Edge Device, a Connection Identifier identifying the channel on the receiving agent that connects to the receiving module, and a Response flag indicating that a "confirmation" response is expected.

Error reports may be transmitted if either the header or an option received in a packet transmission is unrecognizable or has an unacceptable value. Error reports are not used to reject other types of messages. Those rejections are handled using a packet containing a reply packet with an appropriate header reply code. Option fields for option response (RSPCD) and reason (RSNCD) codes also may be used. The options field is variable in length, and includes items such as a Response Code (RSPCD), a reason code (RSNCD), text describing the error (DATA), and an identifier that may contain the SEQ ID of an associated Request message, if appropriate.

If either the TA or router gateway detect that the network-edge device or the back-end host have terminated the connection, they can use the Session-Over message to inform the other party of the termination event. Upon receipt of a Session-Over message, no reply need be transmitted. The options field may include a reason code (RSNCD) in a Session-Over message and meta-data.

A further pair of code field values identify a command request and response. Command Request is used to instruct the receiving peer to perform the command included in the DATA option. Upon receipt of a Command Request, an appropriate reply is transmitted. The options field is variable in length. It contains information such as the command that the peer is to perform (DATA).

If every Option received in a Command Request is recognizable and all values are acceptable, then the implementation transmits a Command Response. The Options field is variable in length, and may contain items such as a Response Code (RSPCD), a reason code (RSNCD), the result of the request command (DATA), etc., and an identifier that contains the SEQ ID of the Command Request.

A Session Init message is sent by an originating TA agent to signal to the terminating Host Handler agent that a "Virtual Circuit" session is beginning. The Options field is variable in length, and may contain meta-data.

A Session Close message is sent by an originating TA agent to signal to the terminating Host Handler agent that a "Virtual Circuit" session is terminating. The Options field is variable in length, and may contain items such as a Response Code (RSPCD), a reason code (RSNCD), meta-data, and an identifier that contains the SEQ ID of the Session Init Request.

A Redirect message is sent by a routing process in the Gateway Router to an originating TA agent to signal to that agent that the last message has been redirected to a new Destination address. The Options field is variable in length, and may contain items such as a reason code (RSNCD) and meta-data.

In many of the message descriptions above, options are mentioned. Options allow requests/responses to carry data between a TA and the router gateway. Some Options may be listed more than once. The effect of this is Option-specific and is not implemented in the embodiments described herein. The end of the list of Options is indicated by the Length field of the overall packet. The consistent format of options is Type (one octet), Length of overall packet (one octet), and Data. Option types include:

| | |
|---|---|
| 00 | RESERVED |
| 01 | HSN - TA Hardware Serial Number |
| 02 | ADDR - Called Address |
| 03 | DATA - Data Packet |
| 04 | RGRC - router gateway Response Code |
| 05 | CUPDF - Configuration Update Flag |
| 06 | RGRCD - router gateway Reason Code |
| 07 | GWADDR - router gateway Address |
| 08 | SIMDAT - TA SIM Data. |
| 09 | HIDENT - HopIdentifier |

The Length field is one octet, and indicates the length of this Option including the Type, Length and Data fields. Note that this means that the maximum length of an individual Option is 255 octets. If an Option is greater, it can be split across multiple packets using the "More Flag" and "Sequence Number". Alternatively, the Length field could be extended.

The Data field is zero or more octets, and contains information specific to the Option. The format and length of the Data field is determined by the Type and Length fields. For many message types, the data filed is one or more octets. When the Data field is indicated by the Length to extend beyond the end of the Information field, the entire packet is silently discarded without affecting the automaton. Other error condition responses could alternatively be used, such as sending an error message.

A message may transmit a TA hardware serial number (HSN). The TA Hardware Serial Number also uniquely identifies the TA to the Gateway Router. Its length, using the options message format described above, is up to 253 octets.

A message may transmit a Called Address (ADDR). The ADDR field contains the address that the network edge device associated with a particular TA attempted to call. The router gateway may use this address (potentially in conjunction with a lookup table) to determine the Back-End Host to which the packet is to be sent. Its length, using the options message format described above, is up to 253 octets. The first octet contains a hex encoded indicator that defines the type of address being called:—

01—PSTN Number.
02—ISDN Number.
03—X.25 Address.
04—Numeric IP address.
05—URL

Additional address types may be implemented. Options may be implemented within another message type or as separate messages.

The data packet option/message typically contains data sent by the network-edge device or back-end host system. It also may include a packet request or text error message sent with an error response. If the length field of the data packet is taken with as the length of the data section alone, an individual data field can be up to 255 octets long. Data longer than 255 octets can be sent using multiple messages and the "more flag" and/or "sequence number" features described. The combined precision of the sequence number and length fields create a theoretical limit for overall packet contents. Due to the nature of the network-edge devices described herein, the theoretical limit should not impair operation. As described, changing the length field precision or the sequence number precision would accommodate a larger theoretical limit.

The response code (RSPCD) option/message allows a peer to inform a partner peer of a particular decision. It typically includes four digits encoded into two octets.

The Configure Update Instruction option/message (CUPDF) allows a router gateway to instruct a TA to send a Configure Update Request. In one embodiment, no data payload is required to make this request.

The Reason Code option/message (RSNCD) allows a router gateway to inform a TA of the reason for a particular decision. It typically includes four digits encoded into two octets.

The Gateway Address option/message (GWADDR) provides the router gateway with a mechanism via which the TA can be instructed to download configuration files or software updates from a different URL/IP address or to instruct a TA to use a different Gateway Router address in the future. The first octet of this field will contain a hex encoded indicator defining the format of the supplied address. Values defined within this embodiment include:

01—Numeric IP address and port.
02—URL and port.

In the case of a numeric IP Address and port number, the address portion will be sent in the 2nd, 3rd, 4th and 5th octets in hex format (e.g. 192.168.1.1 will be encoded as "C0A80101"). The 6th and 7th bytes will contain the port number in hex (e.g. 80 will be encoded as 0080, port 1024 will be encoded as 0400). In the case of a URL, each octet will contain an ASCII character. The parsing application should use the presence of the ":" as a separator between the URL and port number—the port number will be hex encoded in the following two bytes (e.g. 80 will be encoded as 0080, port 1024 will be encoded as 0400).

The TA SIM Data option/message is used to transport the SIM data associated with the SIM used by the TA to initiate a particular session. Each octet of the data field will contain one ASCII character.

The Hop Identifier option/message contains an identifier (same format as SRCID, earlier) that is "added" by any secondary agent (e.g., TA) as it passes a message along the pipeline. The HIDENT field should be added as the "last" optional field in the option sequence. The ordering of this field in the sequence of HIDENTs is significant; the most recent HIDENT is the rightmost HIDENT. Each octet of the data field will contain one ASCII character.

The following table summarizes typically and optionally used options for the messages listed above. The first value in each box applies to the request and the second to the response.

to a communications network. This method may include locally generating a connect sequence between a POTS terminal and a communications device, whereby the communications device appears to the POTS terminal to be a modem accessed via a telephone network. In one embodiment, locally means near the POTS terminal. In another embodiment, locally means on the same premises as the POTS terminal, such as in a telephone closet. Generally, locally means before reaching a tariffed telephone network. In one embodiment, access via a telephone network may be via an analog network, such as a public switched telephone network (PSTN). In some regions of the world, a telephone network would be an ISDN network. Generally, the telephone network is a wired network. The method may include locally decoding and encoding communications with the POTS terminal and conducting a packet-based session between the communications device and an application host.

According to one aspect of this method, locally generating a connect sequence includes the communications device providing the POTS terminal a dial tone, receiving a dialing sequence from the POTS terminal, and presenting the POTS terminal a modem signal. According to another aspect of this method, locally decoding and encoding communications includes translating between data carried on a modem signal and data packets. In some embodiments, the application host engaged in the packet-based session corresponds to a dialing sequence received from the POTS terminal. The terminal adapter may recognize two or more application hosts and select the application host to which the POTS terminal will be connected based on the dialing sequence.

Yet another aspect of the present invention includes connecting multiple communication devices through a packet concentrator linked to a communications host, which may be a router gateway. The packet concentrator and router gateway are adapted to reduce a number of sockets required to maintain a plurality of communications device-to-router gateway links through the packet concentrator. This configuration is illustrated in FIG. 13. A plurality of network edge devices 110 connect to a plurality of terminal adapters 122. These terminal adapters 122 are coupled wirelessly or by wired connection to a packet concentrator 1340. The packet concentrator 1340 includes components described above that are adapted to establishing a wireless or other packet connection with a router gateway. The packet concentrator 1340 further

| FIELD | SIGN ON | SIGN OFF | ECHO TEST | CONFIG UPDATE | PACKET | SESSION OVER | VERSION | REGISTRATION | COMMAND |
|---|---|---|---|---|---|---|---|---|---|
| HSN | M/X | X/X | X/X | X/X | X | X | M/X | M/X | X/X |
| ADDR | X/X | X/X | O/X | X/X | M | O | X/X | X/X | X/X |
| DATA | X/X | X/X | X/X | M/M | M | X | X/X | X/O | M/O |
| RSPCD | X/M | X/M | X/M | X/M | X | X | X/M | X/M | X/M |
| CUPDF | X/O | X/X | X/O | X/O | X | X | X/O | X/X | X/O |
| RSNCD | X/O | O/O | X/O | X/O | X | M | X/O | X/O | X/O |
| GWADDR | X/O | X/X | X/O | X/X | X | X | X/O | X/O | X/O |
| SIMDAT | O/X | O/X | X/X | X/X | X | X | X/X | O/X | X/X |

M = Typically used
O = Optionally used
X = Not Relevant

This invention includes multiple embodiments. Embodiments encompass methods practiced by a plain old telephone system (POTS) terminal, by a terminal adapter device, by a router gateway, and by an installer of adapter devices or router gateways. One embodiment is a method using a communications device to interface a plain old telephone system terminal includes a multiplexer that permits sessions originating in the plurality of network edge devices to be carried by a single connection between the packet concentrator 1340 and the router gateway 126. The router gateway 126 separates the packets into individual sessions and distributes them to a plurality of back-end hosts 114. The connection between the packet concentrator 1340 and the router gateway 126 may be carried by a single socket connection in a wireless network. Alternatively, a relatively small number of socket connections may be used, approximately half or fewer as many connections as would be required if the terminal adapters were connected directly to the router gateway. This is useful in wireless networks that have a tariff structure that includes in tariff calculations the number of socket connections used. This also may be useful, even without a reduced number of socket connections, when some of the terminal adapters are located in RF holes that cannot maintain a stable wireless connection.

This method further may include initiating a communications host session between the communications device and a communications host, prior to generating the connect sequence and conducting the packet-based application host session through the communications host. The communications host may be a router gateway. An aspect of this method extension is that the communications host translates between its packet-based data exchange with the communications device and a modem communications session with the applications host.

According to another aspect of this method, the communications device conducts the application host session until discontinuation by a device other than the communications device. The discontinuation may come from the network-edge device, a communications host or an applications host.

A variation on the method described above, from the perspective of the communications device, uses a communications device to interface a POTS terminal to a communications network. This method may include initiating a packet-based communications host session between a communications device (such as a terminal adapter) and a communications host (such as a router gateway). The method further may include detecting dialing by POTS terminal coupled to the communications device, initiating an application host session between the POTS terminal and an application host, through the communications host, and decoding and encoding communications with the POTS terminal. Accordingly, the communications device may appear to the POTS terminal to be a modem connected to the POTS terminal via a telephone connection. The method further may include conducting the application host session.

In one embodiment of this variation, the communications device presents a dial tone to the POTS terminal. An aspect of this variation may be that the apparent telephone connection appears to be via a telephone network, such as an analog PSTN telephone network or an ISDN network. In some embodiments, the packet-based communications host session is initiated prior to detecting dialing. The session may be initiated either by the communications device or the communications host. In combination with the method described above and their aspects, a single socket may be used by the communications device to conduct multiple application sessions. A single socket may be maintained across multiple application sessions.

Another embodiment of this variation includes translating data between data carried on a modem signal and data packets. The application host session may be initiated after detecting dialing, without need for decoding data from the POTS terminal other than the dialing sequence. The dialing sequence may be a series of DTMF codes. The application host involved in an application host session may correspond to the dialing by the POTS terminal. An application host session may be conducted through the communications device until discontinued by a device other than the communications device.

Another aspect of this method may include connecting multiple communications devices through a packet concentrator linked to the communications host, as described above. A communications host may translate between packet-based data exchange with the communications device and modem communications with an application host.

Another view of methods described herein is from the perspective of a communications host or router gateway. This view includes a method of supporting a communications device coupled to a POTS terminal, including establishing a packet-based communications host session between a communications host and the communications device and establishing an application host session with an application host. The method further includes receiving packets from the communications device containing data decoded from modem-based communications between the communications device and the POTS terminal and conducting the application host session between the communications device and the application host.

According to one aspect of this method, establishing an application host session includes receiving phone number data from the communications device corresponding to a dialing sequence and connecting with an application host corresponding to the phone number data. According to a further aspect, the application host session is conducted through the communications host until discontinuation by a device other than the communications host. The communications host session may be maintained across multiple application host sessions. The communications host session may be conducted through a packet concentrator, wherein the packet concentrator and communications host are adapted to reduce a number of sockets required to maintain a plurality of communications device-to-communications host links through the packet concentrator. It may be that only one socket is required or the number of socket required may be approximately half or less than the number of sockets required if a plurality of terminal adapters were connected directly to the communications host.

A related method is practiced by a POTS terminal. It is a method of conducting a POTS terminal session using a network other than a public switched telephone network (PSTN network), without requiring modification of the POTS terminal. This method may include connecting the POTS terminal to a local communications device, detecting a dial tone provided by the local communications device, dialing a host phone number, and communicating through the local communications device, as if the local communications device were a modem accessed via a PSTN network, with a host application identified to the communications device by the host phone number. From the perspective of an installer, this method may be applied to an incumbent POTS terminal and include substituting connection to the local communications device for a connection between the incumbent POTS terminal and incumbent telephone network. During the substitution, a different telephone number or different host application identifier may be loaded into the POTS terminal, without modifying the POTS terminal itself.

Another aspect of the related method uses a wireless, packet-based communication channel to connect the local communications device and, hence the POTS terminal, to the host application. Variations on this aspect include using a CDMA IS-95 compliant communication channel, a GSM-compliant communication channel or a GPRS-compliant communication channel in a cellular network. Alternatively, this aspect may include using a communications channel compliant with an IEEE 802.11, 802.16 or 802.20 standard.

From the perspective of an installer, the method further may include applying any combination of the methods described above and their aspects and extensions to an incumbent POTS terminal and substituting the communications network for a connection between the incumbent POTS terminal and an incumbent telephone network. During the substitution, a different telephone number or different host application identifier may be loaded into the POTS terminal, without modifying the POTS terminal itself.

Methods of the present invention also may be recast as devices, including a communications device or terminal adapter and/or a communications host or router gateway. The communications device may include resources and logic to practice any of the communications device methods described above, in any combination with aspects and extensions of the methods. The communications host may include resources and logic to practice any of the communications host methods described above, in any combination with aspects and extensions of the methods.

A device practicing aspects of the present invention is a communications device that interfaces a plain old telephone system terminal to a communications network. This communications device includes a connector adapted to couple with the POTS terminal and an onboard modem, in communication with the connector. It further includes logic and resources coupled to the onboard modem, adapted to generate a connect sequence with the POTS terminal using the onboard modem, whereby the communications device appears to the POTS terminal via modem accessed via a telephone network, to locally decoding and code communications with the POTS terminal, and to conduct a packet-based session with an application host.

In one embodiment, the logic and resources adapted to generate a connect sequence with the POTS terminal are further adapted to provide the POTS terminal with a dial tone, to receive a dialing sequence from the POTS terminal, and to present the POTS terminal with the modem signal.

Another device practicing aspects of the present invention is also a communications device that interfaces a plain old telephone system terminal to a communications network. This communications device includes a port adapted to packet-based communications between the communications device and the communication host, a connector adapted to couple with the POTS terminal, and an onboard modem, in communication with a connector. It further includes logic and resources coupled to the onboard modem and that packet-based communications port, adapted to initiate a packet-based communications host session between the communications device and the communications host, to detect dialing by the POTS terminal, and initiate an application host session between the POTS terminal and an application host, through the communications host. The logic and resources are further adapted to decode and encode communications with the POTS terminal, wherein the communications device appears to the POTS terminal to be a modem connected to the POTS terminal via a telephone connection, and conducting the application host session.

The structures of communications devices and communications hosts are described above. Logic that practices methods of the present invention also may be recast as articles of manufacture that include a machine-readable code enabling a computing device to practice the methods. Alternatively, logic that practices the present methods can be recast as a meta-method, involving allowing a connection to a logic host and communicating machine-readable code enabling a computing device to practice the methods, or, connecting to a logic host and receiving machine-readable code enabling a computing device to practice the methods.

While the present invention is disclosed by reference to the embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim:

1. A method using a communications device to interface a plain old telephone system (POTS) terminal, which includes a dial-up modem to transmit data, to a communications network, including:
    initiating a communications host session between the communications device and a communications host, prior to locally generating a connect sequence;
    locally generating a connect sequence between a POTS terminal and a communications device, whereby the communications device appears to the POTS terminal to be a modem accessed via a telephone network;
    locally decoding and encoding communications with the POTS terminal, including recovering digital data from a modem carrier signal received from the POTS terminal; and
    conducting a packet-based session between the communications device and an application host through the communications host using the recovered digital data.

2. The method of claim 1, wherein locally generating a connect sequence includes, the communications device:
    providing the POTS terminal a dial tone;
    receiving a dialing sequence from the POTS terminal; and
    presenting the POTS terminal a modem carrier signal.

3. The method of claim 1, wherein the apparent telephone network appears to be a public switched telephone network ("PSTN").

4. The method of claim 1, wherein the application host engaged in the packet-based session corresponds to a dialing sequence received from the POTS terminal.

5. The method of claim 1, further including connecting multiple communication devices through a packet concentrator linked to a communications host, wherein the packet concentrator and communications host are adapted to reduce a number of sockets required to maintain a plurality of communications device-to-communications host links through the packet concentrator.

6. The method of claim 1, wherein the communications device conducts the application host session until discontinuation by a device other than the communications device.

7. Further including applying the method of claim 1 to an incumbent POTS terminal and substituting communications through the communications device via the communications network for a connection between the incumbent POTS terminal and an incumbent telephone network.

8. A method using a communications device to interface a plain old telephone system (POTS) terminal, which includes a dial-up modem to transmit data, to a communications network, including:
    initiating a packet-based communications host session between a communications device and a communications host;
    detecting dialing by a POTS terminal coupled to the communications device;
    initiating an application host session between the POTS terminal and an application host, through the communications host;

decoding and encoding communications with the POTS terminal, including recovering digital data from a modem carrier signal received from the POTS terminal, wherein the communications device appears to the POTS terminal to be a modem connected to the POTS terminal via a telephone connection; and conducting the application host session using the recovered digital data;

further including connecting multiple communication devices through a packet concentrator linked to the communications host, wherein the packet concentrator and communications host are configured to reduce a number of sockets required to maintain a plurality of communications device-to-communications host links through the packet concentrator.

9. The method of claim 8, wherein the communications device presents a dial tone to the POTS terminal.

10. The method of claim 8, wherein the apparent telephone connection appears to be via a PSTN telephone network.

11. The method of claim 8, wherein the packet-based communications host session is initiated prior to detecting dialing.

12. The method of claim 11, wherein a single socket is used for the communications host session between the communications device and the communications host.

13. The method of claim 8, wherein the application host session is initiated after detecting dialing, without need for decoding data from the POTS terminal other than the dialing sequence.

14. The method of claim 8, wherein the application host corresponds to the dialing sequence received from the POTS terminal.

15. The method of claim 8, wherein the application host session is conducted through the communications device until discontinued by a device other than the communications device.

16. The method of claim 8, wherein the communications device conducts the application host session until discontinuation by other than the communications device.

17. Further including applying the method of claim 8 to an incumbent POTS terminal and substituting communications through the communications device via the communications network for a connection between the incumbent POTS terminal and an incumbent telephone network.

18. A method of supporting a communications device coupled to a POTS terminal, which includes a dial-up modem to transmit data, including:

establishing a packet-based communications host session between a communications host and the communications device;

establishing an application host session with an application host;

receiving packets from the communications device containing data decoded from modem-based communications between the communications device and the POTS terminal; and conducting the application host session between the communications device and the application host;

wherein the packet-based communications host session between a communications host and the communications device is conducted through a packet concentrator, wherein the packet concentrator and communications host are configured to reduce a number of sockets required to maintain a plurality of communications device-to-communications host links through the packet concentrator.

19. The method of claim 18, wherein establishing an application host session includes receiving phone number data from the communications device corresponding to a dialing sequence and connecting with the application host corresponding to the phone number data.

20. The method of claim 18, wherein the application host session is conducted through the communications host until discontinuation by a device other than the communications host.

21. The method of claim 18, wherein the communications host session is maintained across multiple application host sessions.

22. A method of conducting plain old telephone service ("POTS") terminal sessions using a network other than a public switched telephone network ("PSTN network"), without modifying the POTS terminal, including:

connecting the POTS terminal to a local communications device;

detecting a dial tone provided by the local communications device;

dialing a host phone number; and communicating through the local communications device, as if the local communications device were a modem accessed via a PSTN network, with a host application identified to the communications device by the host phone number;

wherein the local communications device acts as a packet concentrator, reducing a number of sockets required to maintain a plurality of POTS terminal-to-application host links through the packet concentrator.

23. Further including applying the method of claim 22 to an incumbent POTS terminal and substituting connection to the local communications device for a connection between the incumbent POTS terminal and an incumbent telephone network.

24. The method of claim 22, wherein the local communications device uses a wireless, packet-based communication channel to provide the POTS terminal access to the host application.

25. The method of claim 24, wherein the wireless, packet-based communication channel is CDMA-compliant.

26. The method of claim 24, wherein the wireless, packet-based communication channel is GSM-compliant.

27. The method of claim 24, wherein the wireless, packet-based communication channel is GPRS-compliant.

28. The method of claim 24 wherein the wireless, packet-based communication channel is compliant with IEEE 802.11, 802.16 or 820.20 standards.

29. A communications device to interface a plain old telephone system (POTS) terminal, which includes a dial-up modem to transmit data, to a communications network, including:

a connector adapted to couple with the POTS terminal;

an onboard modem, in communication with the connector;

logic and hardware resources coupled to the onboard modem, adapted to:

generate a connect sequence with the POTS terminal using the onboard modem, whereby the communications device appears to the POTS terminal to be a modem accessed via a telephone network;

locally decode and encode communications with the POTS terminal, including recovering digital data from a modem carrier signal received from the POTS terminal;

conduct a packet-based session with an application host using the recovered digital data; and act as a packet concentrator to reduce a number of sockets required to maintain a plurality of POTS terminal-to-application host links through the packet concentrator.

30. The device of claim 29, wherein locally generating a connect sequence includes the communications device:
   providing the POTS terminal a dial tone;
   receiving a dialing sequence from the POTS terminal; and
   presenting the POTS terminal a modem signal.

31. A communications device to interface a plain old telephone system (POTS) terminal, which includes a dial-up modem to transmit data, to a communications network, including:
   a port adapted packet-based communications between the communications device and a communications host;
   a connector adapted to couple with the POTS terminal;
   an onboard modem, in communication with the connector;
   logic and hardware resources coupled to the onboard modem and the packet-based communications port, adapted to:
   initiate a packet-based communications host session between the communications device and the communications host;
   detect dialing by the POTS terminal;
   initiate the application host session between the POTS terminal and the application host, through the communications host;
   decoding and encoding communications with the POTS terminal, including recovering digital data from a modem carrier signal received from the POTS terminal, wherein the communications device appears to the POTS terminal to be a modem connected to the POTS terminal via a telephone connection;
   conducting the application host session using the recovered digital data; and
   act as a packet concentrator to reduce a number of sockets required to maintain a plurality of POTS terminal-to-application host links through the packet concentrator.

* * * * *

UNITED STATES PATENT AND TRADEMARK OFFICE
CERTIFICATE OF CORRECTION

PATENT NO. : 7,656,895 B2  Page 1 of 1
APPLICATION NO. : 10/794004
DATED : February 2, 2010
INVENTOR(S) : Burne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1625 days.

Signed and Sealed this

Thirtieth Day of November, 2010

David J. Kappos
*Director of the United States Patent and Trademark Office*